United States Patent
Matsui et al.

[11] Patent Number: 5,921,537
[45] Date of Patent: Jul. 13, 1999

[54] POST-PROCESSING APPARATUS OF DIGITAL IMAGE FORMING APPARATUS

[75] Inventors: Masao Matsui, Yamatokoriyama; Keiji Masuda, Tenri; Takashi Yamanaka, Yamatokoriyama, all of Japan

[73] Assignee: Sharp Kabushiki Kaisha, Osaka, Japan

[21] Appl. No.: 08/815,206

[22] Filed: Mar. 12, 1997

[30] Foreign Application Priority Data

Mar. 14, 1996 [JP] Japan ................................. 8-057819
Mar. 14, 1996 [JP] Japan ................................. 8-057820

[51] Int. Cl.⁶ .................................................. B41F 13/54
[52] U.S. Cl. ................................... 270/1.03; 270/58.14
[58] Field of Search ............................... 270/1.02, 1.03, 270/52.03, 58.07, 58.14

[56] References Cited

U.S. PATENT DOCUMENTS

| | | | |
|---|---|---|---|
| 4,549,804 | 10/1985 | Braun et al. | 270/53 |
| 5,141,215 | 8/1992 | Ishiguro et al. | 270/53 |
| 5,382,012 | 1/1995 | Mandel et al. | 270/53 |
| 5,547,178 | 8/1996 | Costello | 270/52.02 |
| 5,704,602 | 1/1998 | Taylor et al. | 270/1.02 |
| 5,709,374 | 1/1998 | Taylor et al. | 270/1.02 |
| 5,735,202 | 4/1998 | Sakakibara et al. | 270/58.14 |
| 5,738,346 | 4/1998 | Ishida | 270/58.07 |

FOREIGN PATENT DOCUMENTS 60-084549  5/1985  Japan .
62-175384  8/1987  Japan .

Primary Examiner—Noah P. Kamen

[57] ABSTRACT

A post-processing apparatus of a digital image forming apparatus includes first and second bins for storing recorded matter which was output from the digital image forming apparatus and distributed to the respective bins based on image information data such as the name of data contained in the image information relating to the recorded matter. Each of the first and second bins has a display device for displaying the image information data corresponding to recorded matter to be stored in the respective bins, such as the sender of facsimile, the name of data and the name of client who output the data. By displaying on the bins the image information data belonging to the recorded matter, such as the sender of facsimile, the name of data and the name of client who output the data, the operator can easily find the target recorded matter.

22 Claims, 23 Drawing Sheets

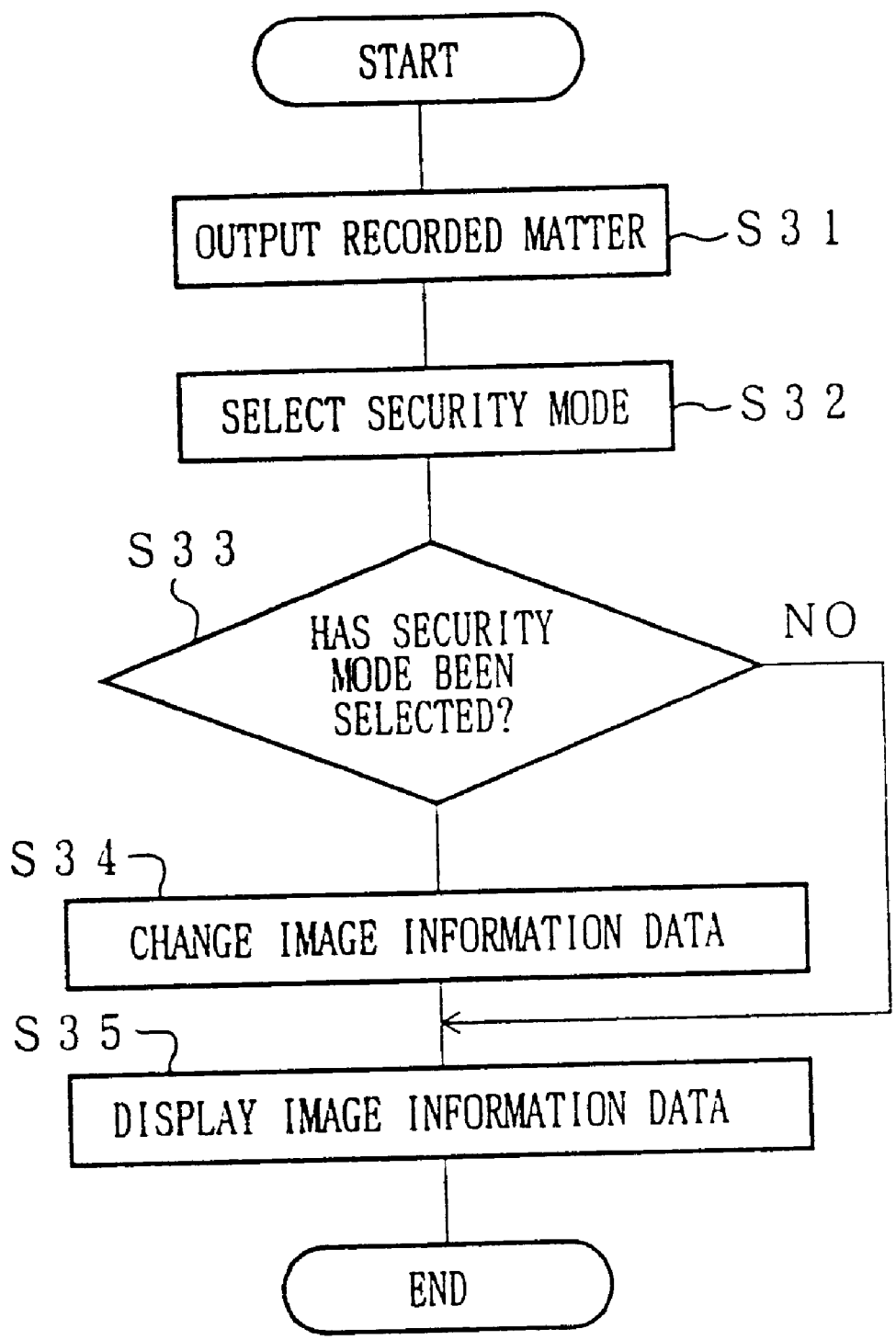

POST-PROCESSING APPARATUS OF DIGITAL IMAGE FORMING APPARATUS

FIELD OF THE INVENTION

The present invention relates to a digital image forming apparatus having composite functions such as a normal copying mode, printer mode, and fax mode, and particularly relates to a post-processing apparatus like a mail box attached to a sheet discharge section of the digital image forming apparatus.

BACKGROUND OF THE INVENTION

In recent years, image forming apparatuses having composite functions including a printer mode, a fax mode, etc. in addition to a normal copying mode have been put into the market. In accordance with this trend, a post-processing apparatus which is attached to the digital image forming apparatus and functions as a mail box as well as a sorter has also been developed as commercial product.

In the case of a conventional post-processing apparatus, whether an error is made in a post-processed sheet is confirmed by an operator after the discharge of all the sheets. Thus, the conventional structure suffers from such a problem that a great deal of labor is required to confirm the occurrence of errors when the number of sheets to be discharged is great though the problem is not so serious when the number of sheets to be discharged is small.

In order to solve this problem, for example, a post-processing apparatus having a display function of displaying the post-processed state of sheets is described in Japanese Publication for Unexamined Patent Application No. 84549/1985 (Tokukaisho 60-84549) disclosing a "printing apparatus". The printing apparatus of this publication monitors the error state along with the processes of forming an image, and sorting and storing sheets performed by the image forming apparatus. When an error is detected in the output sheet, the position where the sheet having the error is stored is indicated. In this structure, when there is an error in the image information output on a sheet which has been sorted and stored in the post-processing apparatus, the position where the sheet is stored can be easily found.

As described above, the recent digital image forming apparatuses have various functions, such as fax and network printers. In such a digital image forming apparatus, it is common to use a post-processing apparatus such as a mail box for automatically separating the recorded matter to a bin provided for temporarily storing the recorded matter. The recorded matter usually contains information relating to the image corresponding to image data (image information data), i.e., various information such as the sender of facsimile, the name of data, and the name of client who output the data.

However, when a lot of recorded matter is output from the same image forming apparatus, it is difficult for an operator to find recorded matter addressed to the operator or recorded matter output to the bin by the operator itself. In particular, in the post-processing apparatus of a digital image forming apparatus having a plurality of bins, if the mail box is capable of variably changing the allotment of addressees, it is difficult to know which bin is to be searched.

SUMMARY OF THE INVENTION

It is an object of the present invention to provide a post-processing apparatus of a digital image forming apparatus which enables an operator to easily find the target recorded matter by displaying image information data belonging to recorded matter formed by the digital image forming apparatus, such as the sender of facsimile, the name of data and the name of client who output the data.

It is also an object of the present invention to provide a post processing apparatus of a digital image forming apparatus including a plurality of bins attached to the post-processing apparatus, which enables an operator to easily find the target recorded matter by providing with various information relating to the bins of the post-processing apparatus with the display of information indicating whether recorded matter is stored in the bins for temporarily storing recorded matter formed in the digital image forming apparatus, and information relating to the recorded matter stored in the bins, for example, image information data belonging to the recorded matter, such as the sender of facsimile, the name of data, and the name of client who output the data.

In order to achieve the above object, a post-processing apparatus of a digital image forming apparatus of the present invention is characterized in that the post-processing apparatus is attached to the digital image forming apparatus for forming an image on a recording medium based on digital image data and outputting the image on the recording medium as recorded matter, and includes a plurality of bins for storing recorded matter output from the digital image forming apparatus, a mechanism for distributing the recorded matter to the bins according to image information data belonging to the image data of the recorded matter, and a display device for displaying the image information relating to the recorded matter stored in the bins.

Since the post-processing apparatus of the digital image forming apparatus includes the display device for displaying the image information data belonging to the images on the recorded matter to be stored in each bin, the display device can display the image information data relating to the transmitter of the recorded matter, such as the name of client and the sender of facsimile.

Therefore, the operator can know which recorded matter is stored in which bin by just looking at the display device without directly looking at the recorded matter stored in the bins. Consequently, it is possible to promptly find the target matter with ease.

Additionally, in order to achieve the above object, a post-processing apparatus of a digital image forming apparatus of the present invention is characterized in that the post-processing apparatus is attached to the digital image forming apparatus for forming an image on a recording medium based on digital image data and outputting the image on the recording medium as recorded matter, and includes a plurality of bins for storing recorded matter output from the digital image forming apparatus, a mechanism for distributing the recorded matter to the bins according to image information data belonging to the image data of the recorded matter, and a display device, attached to each bin, for displaying the information relating to the bins.

In the above-mentioned post-processing apparatus of the digital image forming apparatus, since the display device for displaying the information relating to the bin is mounted on each bin, it is possible to provide an operator with detailed information of the respective bins, for example, information indicting the presence of recorded matter and image information data belonging to the image data of the recorded matter stored in the bins.

In this structure, an operator can easily recognize not only information relating to the recorded matter addressed to the operator, but also information of a facsimile and the like addressed to the operator. Consequently, the operator can easily find the target recorded matter.

Furthermore, a post-processing apparatus of a digital image forming apparatus is characterized in that the post-processing apparatus is attached to the digital image forming apparatus for forming an image on a recording medium based on digital image data and outputting the image on the recording medium as recorded matter, and includes a plurality of bins, arranged in a vertical direction, for storing recorded matter output from the digital image forming apparatus, a mechanism for distributing the recorded matter to the bins according to image information data belonging to the image data of the recorded matter, and a display device for displaying the image information relating to the bin, the display device having a screen formed so that the tilt angle of the screen with respect to a direction perpendicular to a surface of the post-processing apparatus to which the display device is attached becomes greater as the position of height of the display device in relation to the post-processing apparatus becomes lower.

In the above-mentioned post-processing apparatus, since the screen of each display device is formed so that the tilt angle of the screen with respect to a direction perpendicular to a surface of the post-processing apparatus to which the display device is attached becomes greater as the position of height of the display device in relation to the post-processing apparatus becomes lower, the operator can see the display content in the display device of the bin located in a lower position of the post-processing apparatus by just seeing in a downward direction from a normal operating position without bending.

Thus, the operator can see the information relating to the respective bins in a normal operating state without changing posture, thereby achieving improved handling of the apparatus.

For a fuller understanding of the nature and advantages of the invention, reference should be made to the ensuing detailed description taken in conjunction with the accompanying drawings.

BRIEF DESCRIPTION OF THE DRAWINGS

FIG. 24 is a flow chart showing the flow of the display control in the display of still another post-processing apparatus of the present invention.

DESCRIPTION OF THE PREFERRED EMBODIMENTS

One embodiment of the present invention will be discussed below. This embodiment will explain a post-processing apparatus of a digital image forming apparatus having composite functions, such as a copying mode, a printer mode, and a fax mode.

Figure 2:
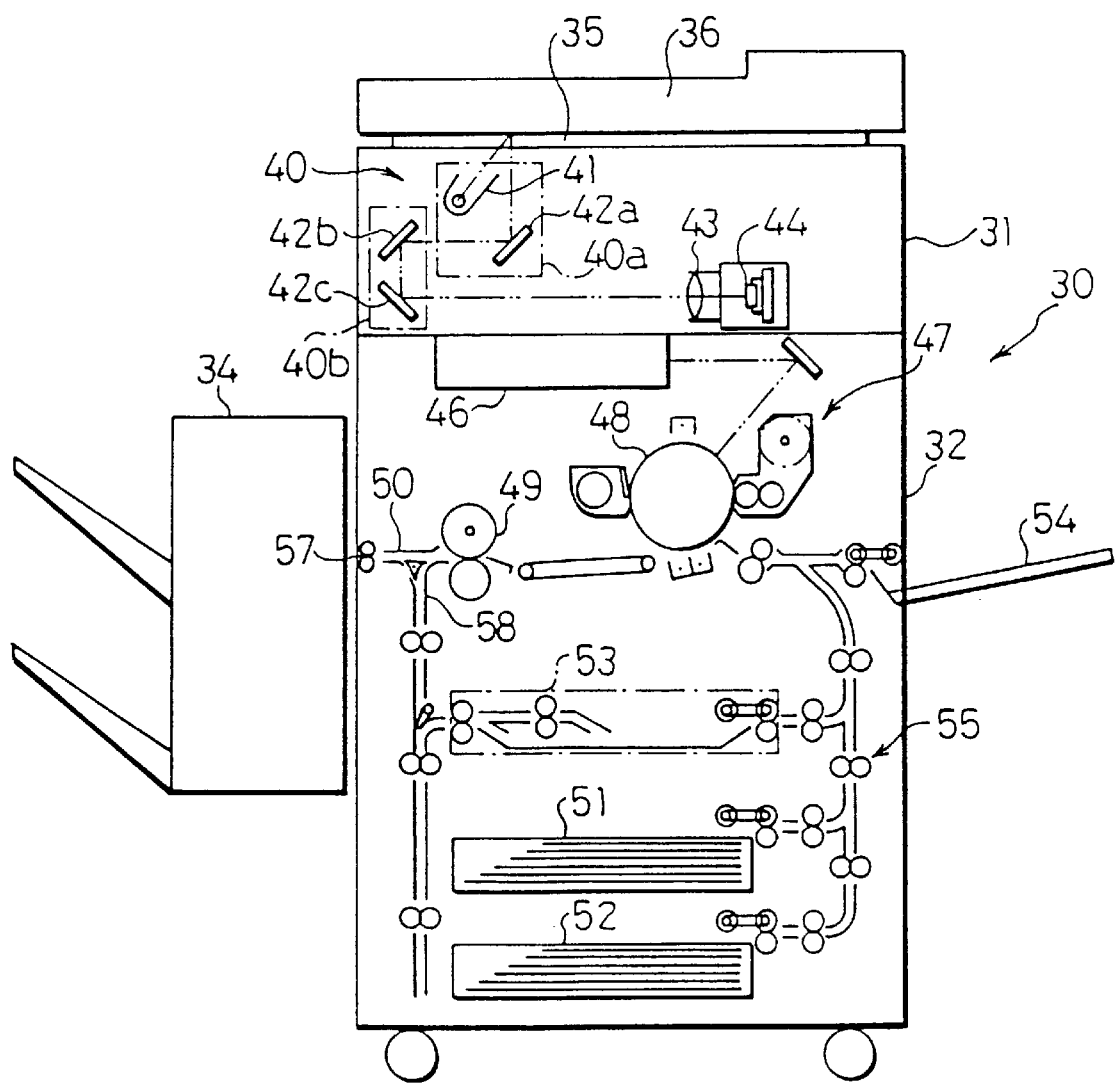
FIG. 2 is a view schematically showing the structure of the digital image forming apparatus including the post-processing apparatus shown in FIG. 1.

As illustrated in FIG. 2, the digital image forming apparatus of this embodiment is composed mainly of a scanner section 31, and a laser recording section 32 as an image recording section.

The scanner section 31 includes a document platen 35 made of transparent glass, a recirculating automatic document feeder (RADF) 36 for automatically supplying a document onto the document platen 35, a document image reading unit, i.e., a scanner unit 40, for reading the image on the document placed on the document platen 35 by scanning. The document image read by the scanner unit 40 is sent as image information, i.e., image data, to the image processing system, to be described later, and undergoes predetermined image processing.

The RADF 36 is a device for automatically feeding to the document platen 35 of the scanner unit 40 a sheet of document at a time from sheets of documents set on a predetermined document tray. The RADF 36 includes a transport path for single-side documents, a transport path for double-side documents, and a transport-path switching mechanism so that one side or both sides of documents is/are read by the scanner unit 40 according to a selection made by an operator.

The scanner unit 40 includes a first scanning unit 40a, a second scanning unit 40b, an optical lens 43, and a CCD (charge coupled device) 44. The first scanning unit 40a is formed by a first reflecting mirror 42a, and a lamp reflector assembly 41 which performs scanning by irradiating light on the plane of a document on the document platen 35.

The second scanning unit 40b is formed by a second reflecting mirror 42b, and a third reflecting mirror 42c. The first to third reflecting mirrors 42a to 42c guide the reflected light from the document to the CCD 44. The optical lens 43 forms on the CCD 44 the image of the reflected light image from the document. The CCD 44 converts the reflected light image from the document to electrical image signals.

The scanner section 31 successively places documents on the document platen 35 by the interaction of the RADF 36 and the scanner unit 40, and moves the scanner unit 40 along the bottom surface of the document platen 35 so as to read the document image and convert the image to image data.

The data from the scanner section 31 is sent to the image processing system, to be described later, for various image processing, and then temporarily stored in a memory 73, to be discussed later, in the image processing system. Thereafter, the image data is transmitted to the laser printer section 32 according to an output instruction, and recorded as an image on a sheet as a recording medium.

The laser printer section 32 includes a laser writing unit 46 and an electrophotographic processing section 47 for forming an image at the upper part therein, and a sheet storage and transport section 55 at the lower part therein.

The laser writing unit 46 includes a semiconductor laser for emitting laser light corresponding to the image data from the memory 73, a polygon mirror for deflecting the laser light at a constant angular velocity, and an f·θ lens for correcting the laser light deflected at the constant angular velocity to be deflected at a constant velocity on a photoreceptor drum 48 of the electrophotographic processing section 47.

The electrophotographic processing section 47 is formed by the photoreceptor drum 48, charging, developing, transfer, separating, and clearing devices disposed around the photoreceptor drum 48, and a fixing device 49 in a known manner. A transport path 50 is formed on a downstream side of the fixing device 49 in the transport direction of a sheet on which an image is to be formed. The transport path 50 branches to form a sheet discharge opening 57 extending to the post-processing apparatus 34 and a transport path 58 extending to the sheet storage and transport section 55.

The sheet storage and transport section 55 includes a first cassette 51, a second cassette 52, a double-side copy unit 53, and a multi-manual-feed tray 54. A pile of sheets are stored in the first cassette 51 and the second cassette 52. When a cassette containing sheets of a desired size is selected by the operator, sheets are fed one at a time from the topmost sheet in the pile of sheets contained in the selected cassette, and sequentially transported to the electrophotographic processing section 47. The double-side copy unit 53 feeds the sheet having an image formed in the electrophotographic processing section 47 to the electrophotographic processing section 47 again by reversing or not reversing the sheet.

In the laser printer section 32, the image data read from the memory 73 is emitted as a laser beam from the laser writing unit 46, and forms an electrostatic latent image on the surface of the photoreceptor drum 48. The electrostatic latent image is visualized into a toner image. After electrostatically transferring the toner image onto a sheet supplied from the sheet storage and transport section 55, the toner image is fixed on the sheet by the fixing device 49.

The sheet carrying the image thereon is transported from the fixing device 49 to the post-processing apparatus 34 through the transport path 50 and sheet discharge opening 57, or again transported to the electrophotographic processing section 47 through the transport paths 50 and 58 and the double-side copying unit 53.

Figure 3:
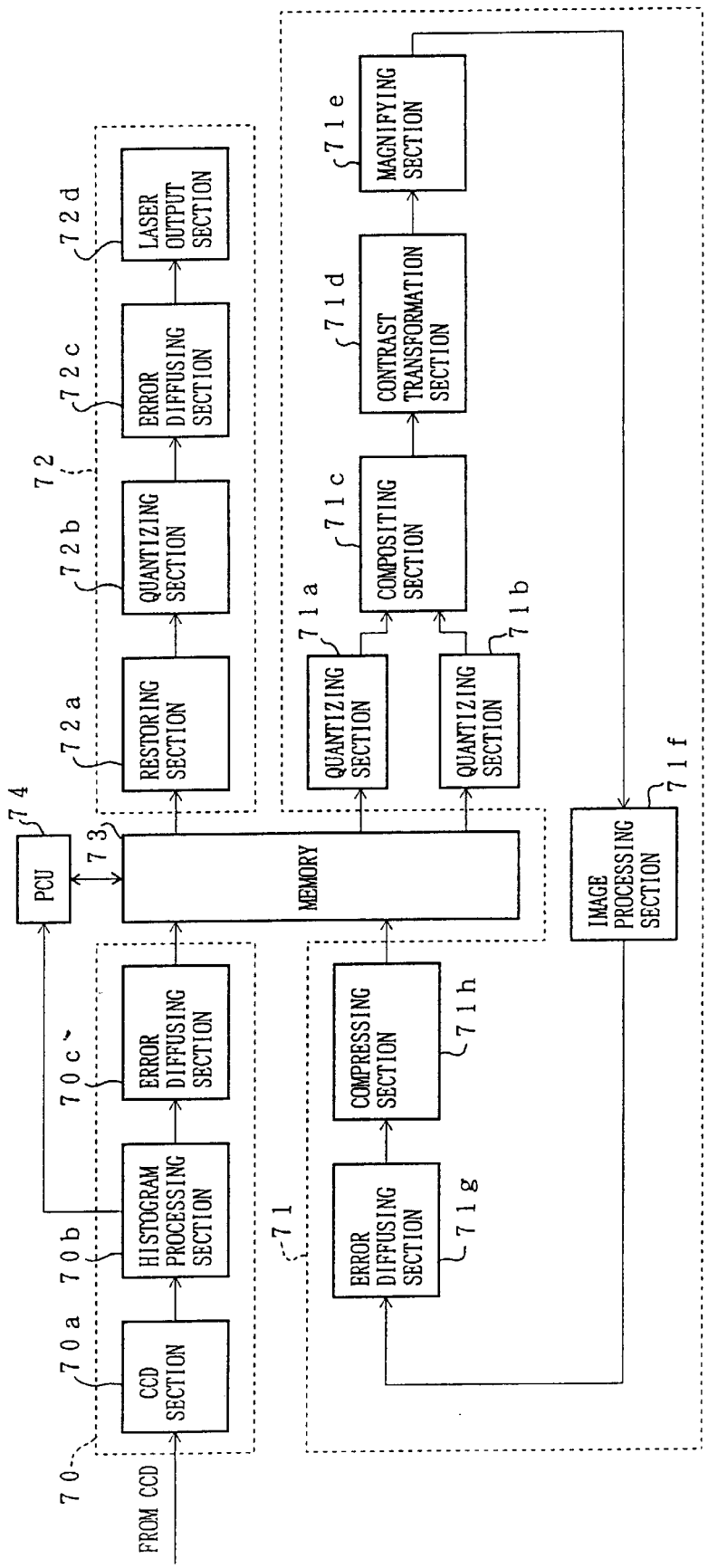
FIG. 3 is a block diagram showing the structure of an image processing system in the digital image forming apparatus shown in FIG. 2.

The following description will discuss the image processing system in a digital image forming apparatus 30. In the image processing system, the image data of the document obtained from the scanner section 31 undergoes image processing. As illustrated in FIG. 3, the image processing system includes an image data input section 70, an image data processing section 71, an image data output section 72, a memory 73, and a print control unit (hereinafter referred to as "PCU") 74 as a transmission control section and a processing control section.

The PCU 74 is formed by a CPU (central processing unit) to control the whole operations of the digital image forming apparatus 30. The memory 73 is made of a RAM (random access memory) or a hard disk to store image data.

The image data input section 70 includes a CCD 70a, a histogram processing section 70b, and an error diffusing section 70c. The image data input section 70 converts the image data of the document read by the CCD 44 into one-bit digital data, and processes the image data by an error diffusing method while making a histogram as binary digital quantity. The processed data is then temporarily stored in the memory 73.

In the CCD section 70a, analog signals representing the densities of pixels of the image data are converted into digital signals. The digital signals are corrected by the MTF (modulation transfer function) correction, the black-and-white level correction, or the gamma correction. Then, (8-bit) digital signals representing 256 tones are transmitted to the histogram processing section 70b.

In the histogram processing section 70b, the digital signal output from the CCD section 70a is added according to the pixel densities of 256 tones so as to obtain density information (histogram data). The density information is sent as pixel data to the error diffusing section 70c, and to the PCU 74 if necessary.

In the error diffusing section 70c, the 8-bit/pixel digital signal output from the CCD section 70a is converted into 1-bit (binary) digital signal, and relocation is performed for faithfully reproducing the densities of local portions of the document according to the error-diffusing method. The error diffusing method is a type of pseudo-half-tone processing, and an error caused by the conversion to one bit is reflected when converting adjacent pixel into one bit.

The image data processing section 71 includes quantizing sections 71a and 71b, a compositing section 71c, a contrast transformation section 71d, a magnifying section 71e, an image processing section 71f, an error diffusing section 71g, and a compressing section 71h. The image data processing section 71 converts the input image data into image data of a form desired by the operator. The image data processing section 71 processes the image data until all the image data has been converted into a desired final form and stored in the memory 73. The processing sections 71a to 71h in the image data processing section 71 do not always perform their functions but perform their functions as the need arises.

The image data converted into a one-bit form by the error diffusing section, 70c is reconverted into 256 tones by the quantizing sections 71a and 71b. In the compositing section 71c, a logical operation, i.e., logical OR, AND, or exclusive-OR operation is selectively carried out for each pixel. The data subjected to this operation is the image data stored in the memory 73 and bit data from a pattern generator (PG).

In the contrast transformation section 71d, the relationship between the output density and input density is freely determined based on a predetermined contrast transformation table with respect to the data representing 256 tones. In the magnifying section 71e, interpolation is performed based on the known data input according to a selected magnification ratio so as to obtain pixel data (a density level) of target pixels after magnified. Thereafter, magnification processing is performed in a main scanning direction after executing magnification processing in a sub-scanning direction.

In the image processing section 71f, the input pixel data undergoes various image processing, and information is collected, for example, to extract features from data stream. The error diffusing section 71g performs a function similar to that of the error diffusing section 70c of the image data input section 70. In the compressing section 71h, the one-bit data is compressed by run length encoding. If the image data from the error diffusing section 71g has a final form of output image data, the compression of data is performed in the final processing loop.

The image data output section 72 includes a restoring section 72a, a quantizing section 72b, an error diffusing section 72c, and a laser output section 72d. The image data output section 72 restores the image data which has been compressed and stored in the memory 73, reconverts the data into data representing 256 tones, converts the resulting data into data represented by two bits which gives a smoother halftone image than one-bit data does, and transmits the data to the laser output section 72d.

In the restoring section 72a, the image data compressed by the compressing section 71h is restored. The quantizing section 72b performs processing in the same manner as in the quantizing sections 71a and 71b of the image data processing section 71. The error diffusing section 72c performs processing in the same manner as in the error diffusing section 70c.

The laser output section 72d converts the image data into a laser ON/OFF signal according to the control signal from a sequence controller, not shown. The semiconductor laser in the laser writing unit 46 is switched between ON and OFF by the ON/OFF signal, and an electrostatic latent image is formed on the photoreceptor drum 48.

The data processed in the image data input section 70 and the image data output section 72 is basically stored in the form of one-bit data in the memory 73 in order to save the memory capacity of the memory 73. However, considering the degradation of the image data, the data may be stored in the form of two-bit data.

The operations of the digital image forming apparatus 30 is controlled by the above-mentioned PCU 74. The control system of the PCU 74 is shown in FIG. 4.

Figure 4:
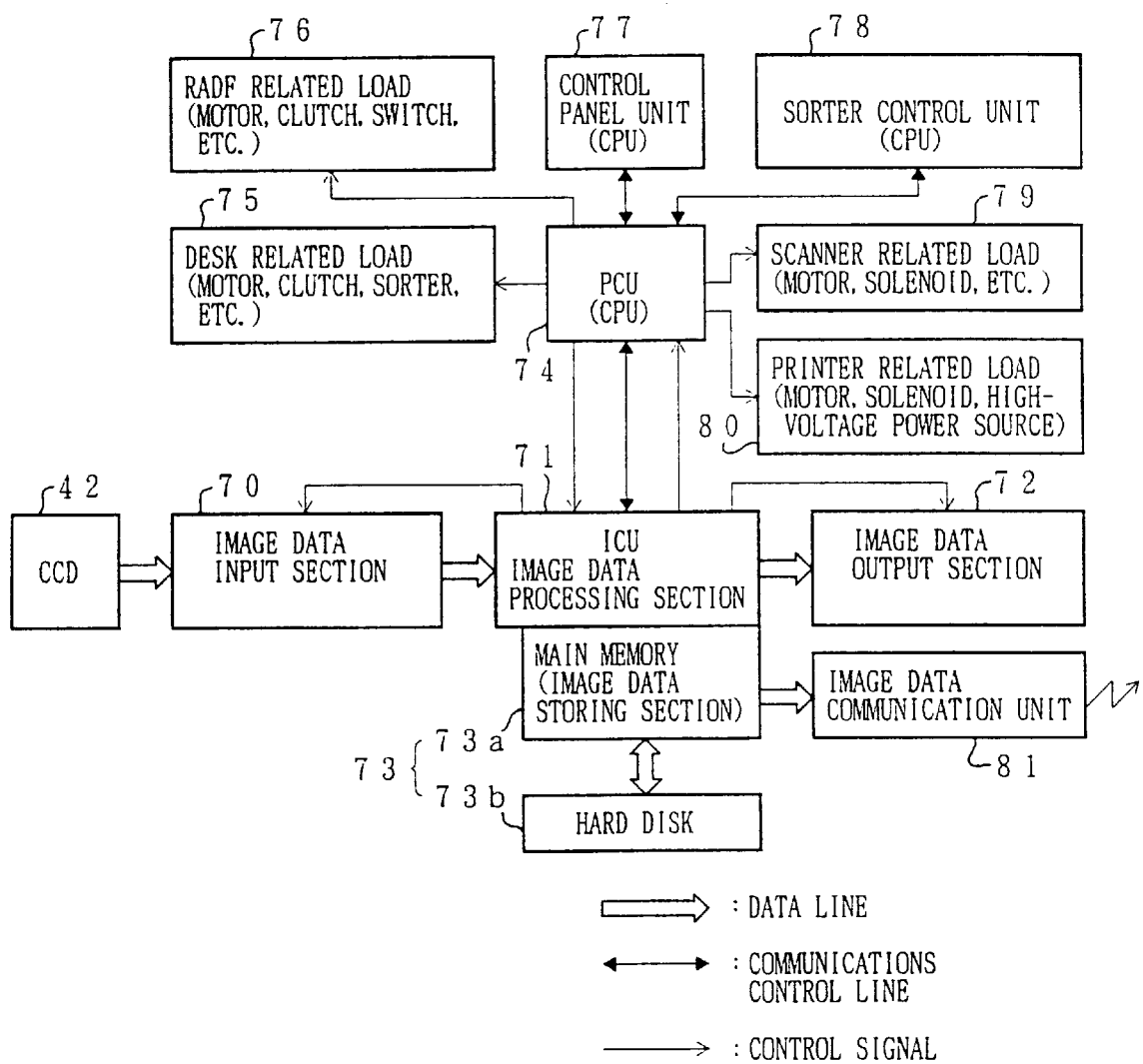
FIG. 4 is a block diagram showing the structure of a control system in the digital image forming apparatus shown in FIG. 2.

As shown in FIG. 4, the PCU 74 is connected to a desk related load 75, a RADF related load 76, an operation panel unit 77, a sorter control unit 78, a scanner related load 79, a printer related load 80, and the image data processing section 71.

The PCU 74 manages the respective sections by the sequence control, and outputs control signals to the respective sections during control. The desk related load 75 is a load of the motor, clutch, etc. in the sorter of the post-processing apparatus 34 other than the main body of the digital image forming apparatus 30. The RADF related load 76 is a load of the motor, clutch, etc. in the RADF 36. The scanner related load 79 is a load of the motor, solenoid, etc. in the scanner unit 40. The printer related load 80 is a load of the motor, solenoid, high voltage power source, etc in the electrophotographic processing section 47.

The sorter control unit 78 includes a CPU, and controls the operation of the sorter based on the control signal from the PCU 74. The sorter control unit 78 is disposed in the post-processing apparatus 34, to be described later, and controls the display of image information data, such as the sender of facsimile, belonging to recorded matter to be output. The post-processing apparatus 34 will be explained in detail later.

The operation panel unit 77 includes a CPU, and functions as an input section through which various settings, for example, selecting the copy mode, and instructions are input to the digital image forming apparatus 30 by the operator. The operation panel unit 77 transmits to the PCU 74 a control signal according to a mode selected by the operator, for example, the copy mode. The PCU 74 activates the digital image forming apparatus 30 in the selected mode according to the control signal.

On the other hand, the PCU 74 transmits a control signal indicating the operation state of the digital image forming apparatus 30 to the operation panel unit 77. In order to inform the operator of the current state of the operation of the digital image forming apparatus 30, the operation panel unit 77 displays the state in the display section according to the control signal.

The memory 73 connected to the image data processing section 71 is formed by a hard disk 73b, and a main memory 73a made of, for example, a semiconductor memory. An image data communication unit 81 is connected to the main memory 73a. The image data communication unit 81 is provided so as to enable the communication of information including image data and image control signals with other digital information device.

Figure 5:
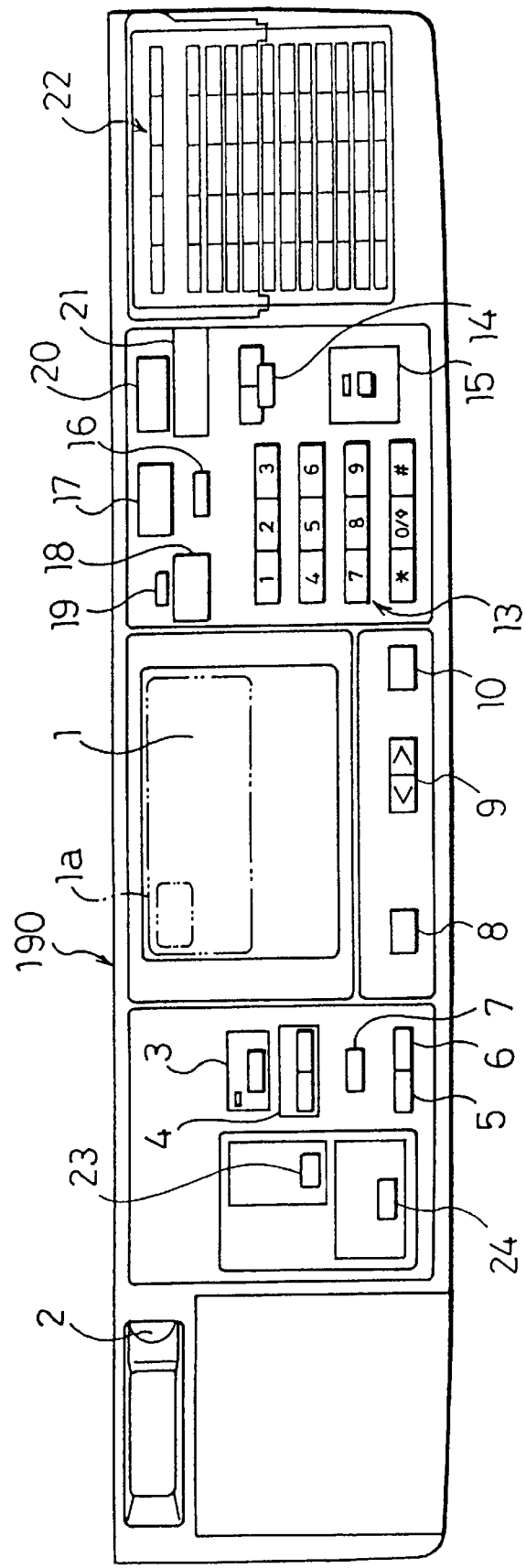
FIG. 5 is a front view of a control panel of the digital image forming apparatus shown in FIG. 2.

The operation panel unit 77 includes a control panel 190 as an input section shown in FIG. 5. A liquid crystal display device 1 as a touch-panel-type display section is disposed at the center of the control panel 190. A screen switching instructing area 1a is provided at a part of the screen of the liquid crystal display device 1. The screen switching instructing area 1a is provided so as to allow an operator to input an instruction to switch the displayed screen of the liquid crystal display device 1 to an image editing function selecting screen. When the area 1a is directly pressed with the operator's finger, the list of various editing functions is displayed on the screen of the liquid crystal display device 1 so that a desired function is selected. At this time, when the region of a desired editing function among the regions of various functions displayed is pressed with the operator's finger, the desired editing function is selected.

Moreover, a brightness adjusting dial 2 for adjusting the brightness of the screen of the liquid crystal display device 1 is provided on the left side of the control panel 190 as shown in FIG. 5. Provided between the dial 2 and the liquid crystal display device 1 are an automatic magnification ratio selecting key 3, a zoom key 4, fixed magnification ratio keys 5 and 6, a 100% magnification ratio key 7, a double-side mode selecting key 23, and a post-processing mode selecting key 24.

The automatic magnification ratio selecting key 3 is pressed to automatically select a magnification ratio of copying. The zoom key 4 enables the magnification ratio of copying to be set in percentage. Each of the fixed magnification ratio keys 5 and 6 is pressed to select a fixed magnification ratio. The 100% magnification ratio key 7 permits returning to a normal magnification ratio (100%). The double-side mode selecting key 23 is pressed to select the double-side copy mode. The post-processing mode selecting key 24 is pressed to select an operation mode of the post-processing apparatus 34 (FIG. 1) for sorting recorded matter output from the digital image forming apparatus 30.

A density switching key 8, a density adjustment key 9 and a tray selecting key 10 are provided below the liquid crystal display device 1 as shown in FIG. 5. The density switching key 8 is provided to switch the adjustment of density among the automatic, manual and photograph modes in copying. The density adjustment key 9 is pressed for a fine adjustment of the density level when the manual mode or the photograph mode is selected. The tray selecting key 10 is pressed to select a desired sheet size from the sizes of sheets stored in the sheet storage and transport section 55 of the digital image forming apparatus 30.

Moreover, as shown in FIG. 5, provided on the right side of the liquid crystal display device 1 are a number selecting key 13, a clear key 14, a start key 15, a reset key 16, an interruption key 17, an operation guide key 18, a message forward key 19, a memory transmission mode key 20, a copy/fax mode switching key 21, and a one-touch dial key 22.

The number selecting key 13 is pressed to select the number of copies to be produced. The clear key 14 is pressed to clear a selected number of copies, or to interrupt successive copying operations before being completed. The start key 15 is pressed to instruct the start of copying. The reset key 16 is pressed to cancel all the modes currently set and restore the normal mode. When successive copying operations are being performed, if a copy of another document needs to be produced, the interruption key 17 is pressed. When the operator does not know how to operate the digital image forming apparatus 30, the operation guide key 18 is pressed. When the operation guide key 18 is pressed, the way to operate the digital image forming apparatus 30 is displayed in the liquid crystal display device 1. The message forward key 19 is pressed to change the message displayed upon the pressing of the operation guide key 18 while forwarding the displayed message.

The memory transmission mode key 20, the copy/fax.printer mode switching key 21, and the one-touch dial key 22 are selecting keys relating to the fax mode. The memory transmission mode key 20 is pressed to instruct the transmission of a document after temporarily storing the document in the memory. The copy/fax.printer mode switching key 21 is pressed to switch the mode of the digital image forming apparatus 30 between copying and fax modes. The one-touch dial key 22 is pressed to start the transmission of a telephone call to an addressee whose telephone number was stored in the digital image forming apparatus 30 in advance.

The above-mentioned structure of the control panel 190, relating to the types and locations of the various keys, is merely an example. Therefore, the structure of the control panel 190 may vary depending on various functions provided for the digital image forming apparatus 30.

Figure 1:
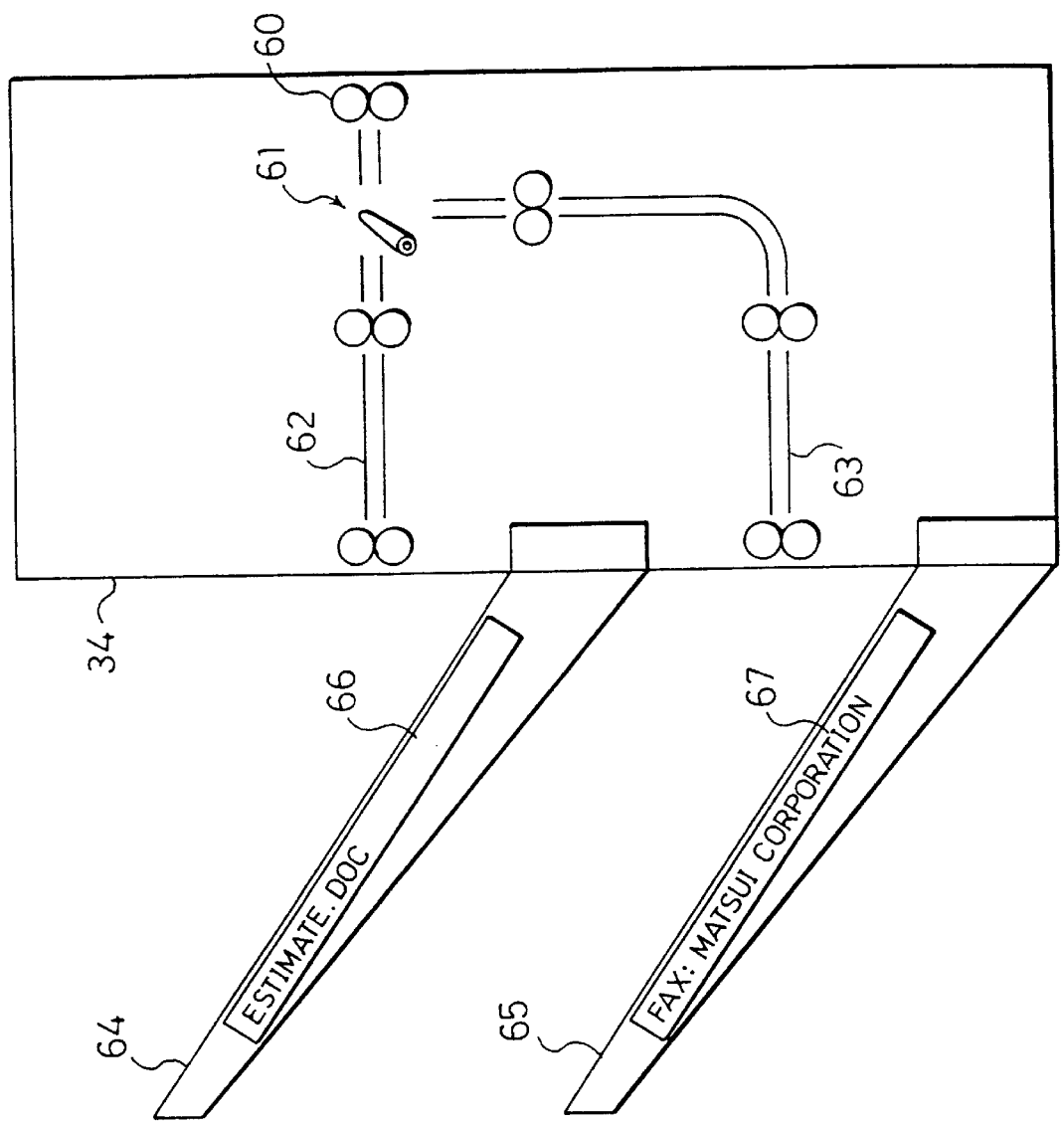
FIG. 1 is a view schematically showing the structure of a post-processing apparatus of a digital image forming apparatus of the present invention.

Referring now to FIG. 1, the following description will explain in detail the post-processing apparatus 34 of the digital image forming apparatus of the above-mentioned structure.

As illustrated in FIG. 1, the post-processing apparatus 34 includes a sheet receiving opening 60 for receiving a sheet output from the sheet discharge opening 57 of the digital image forming apparatus shown in FIG. 2, a first sheet transport path 62 for transporting a sheet guided from the sheet receiving opening 60, a second sheet transport path 63, and transport direction switching element 61 for distributing sheets from the sheet receiving opening 60 to either the first sheet transport path 62 or the second sheet transport path 63. The switching operation of the transport direction switching element 61 is controlled by the sorter control unit 78 according to the control signal from the PCU 74.

In addition, the post-processing apparatus 34 is provided with a first bin 64 for storing sheets output from the post-processing apparatus 34 through the first sheet transport path 62, and a second bin 65 for storing sheets output from the post-processing apparatus 34 through the second sheet transport path 63.

In such a structure of the post-processing apparatus 34, first, the transport direction of a sheet input from the sheet receiving opening 60 is determined by the transport direction switching element 61. Then, the sheet is guided to an appropriate direction according to the determined transport direction.

The sheet whose transport direction has been determined by the transport direction switching element 61 passes through either the first sheet transport path 62 or the second sheet transport path 63, and is then output to the first bin 64 or second bin 65 for temporarily storing sheets (recorded matter).

The first bin 64 and the second bin 65 are provided with display devices 66 and 67, respectively, for displaying the data of the image belonging to the recorded matter stored in the respective bins (hereinafter referred to as the "image information data"), for example, the sender of facsimile, the name of data, the name of client, personal name, the division and section.

The distribution of recorded matter to the first bin 64 and second bin 65 is carried out according to the image information data. There are various methods for distribution. In this embodiment, the distribution of recorded matter is performed by the operator through the control panel 190 as the need arises. In the general explanation below, the first and second bins are together called the "output bins".

The distribution of recorded matter to the respective bins is performed by the operator using the control panel 190. For example, as illustrated in FIG. 1, in the post-processing apparatus 34, when recorded matter of data name "Estimate. DOC" is allotted to the first bin 64 and a facsimile from Matsui Corporation is allotted to the second bin 65, the display devices 66 and 67 display "ESTIMATE. DOC" and "FAX: MATSUI CORPORATION", respectively. This means that the recorded matter of data name "Estimate. DOC" and the facsimile from Matsui Corporation are stored in the first bin 64 and second bin 65, respectively, as the recorded matter from the digital image forming apparatus.

In the display sections of the display devices 66 and 67, for example, a LCD (liquid crystal display) panel and a PDP (plasma display panel) may be used. However, the display sections are not particularly limited to these panels. Namely, it is possible to use a dot matrix type display device if it can display image information data, for example, character information and simple symbols.

The display control of the display devices 66 and 67 is performed by the sorter control unit 78.

Figure 6:
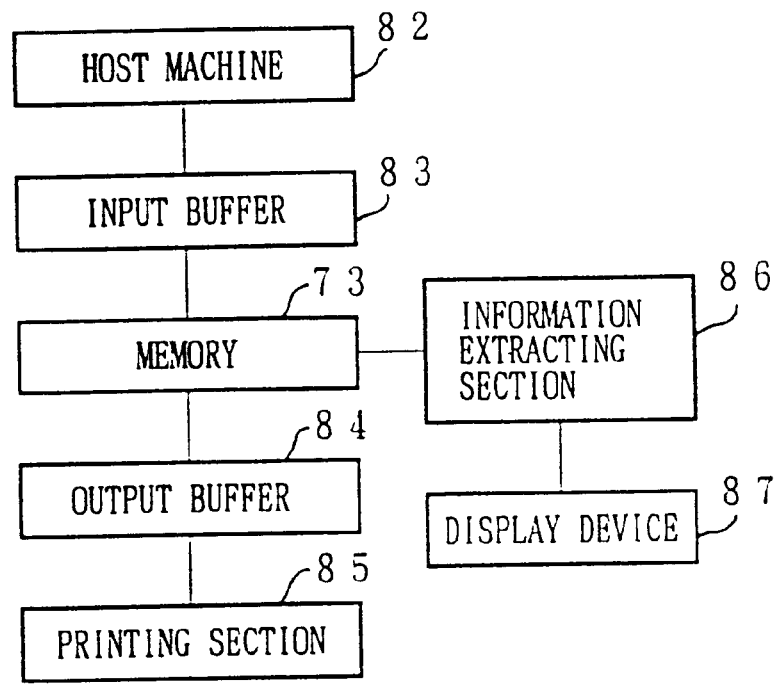
FIG. 6 is a block diagram showing an example of the structure of the control system of the post-processing apparatus shown in FIG. 1.

Referring now to the block diagram shown in FIG. 6, the following description will discuss one example of the method of displaying the image information data under the control of the sorter control unit 78.

Image data and image information data generated by a host machine 82 are temporarily stored in the memory 73 through an input buffer 83 in the digital image forming apparatus. The image data among the stored data is sent through an output buffer 84 to a printing section 85, and then printed. On the other hand, the image information data is extracted by an information extracting section 86 and displayed in the display device 87. The above-mentioned image data and image information data are generated in the host machine 82. However, it is also possible to generate such data in the digital image forming apparatus 30 shown in FIG. 2.

Figure 7:
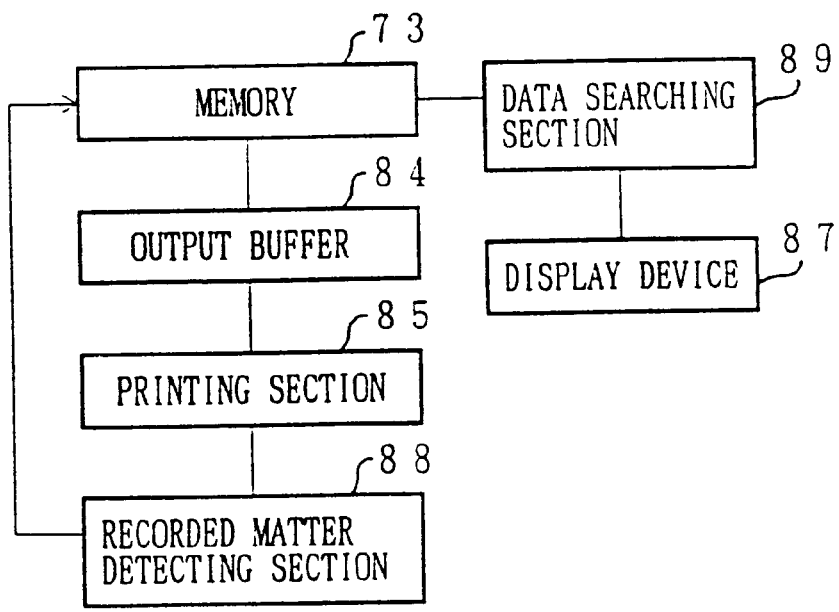
FIG. 7 is a block diagram showing another example of the structure of the control system of the post-processing apparatus shown in FIG. 1.

The following description will discusses another example of the method of displaying image information data with reference to the block diagram shown in FIG. 7.

In the memory 73, the image data and image information data input to the digital image forming apparatus from an external device or generated in the digital image forming apparatus are stored. The image data among the stored data is sent through the output buffer 84 to the printing section 85, and then printed. On the other hand, the image information data is searched by a data searching section 89. When the image information data of the target recorded matter is searched, the display device 87 of the output bin of the post-processing apparatus 34 displays information that the recorded matter corresponding to the image information data is stored in the output bin.

Even when the search is performed by the data searching section 89, the image information data continues to be stored in the memory 73 until a recorded matter detecting section 88 detects that the recorded matter has been removed from the bin displaying the image information data.

For example, the recorded matter detecting section 88 uses an actuator-type sensor which is generally used in copying machines. By providing the output bin with the sensor, it is possible to detect whether the recorded matter is present in the output bin. For example, the recorded matter detecting section 88 is arranged as follows. In the case where recorded matter is present, the actuator falls and the sensor is ON. On the other hand, in the case where recorded matter is not present, the actuator does not fall and the sensor is OFF. With this arrangement, a signal indicating the presence of recorded matter is output when the actuator falls and the sensor is ON. This arrangement is merely an example, and it is not necessary to limit the recorded matter detecting section 88 to the above-mentioned actuator.

In the above-mentioned structure, by providing each output bin of the post-processing apparatus 34 with the display device for displaying image information data relating to recorded matter, it is possible to obtain detailed information of the recorded matter without taking out the recorded matter stored in the respective bins. Consequently, the recorded matter output to the post-processing apparatus 34 can be easily found. In particular, since the output bin itself displays the image information data, it is possible to intuitively understand that the displayed information is the information corresponding to the recorded matter stored in the output bin.

Therefore, by displaying the sender of facsimile, the name of data, the name of client, etc. as the image information data in the display section of the output bin, an operator can easily recognize whether recorded matter has been sent from an external device and the sender of the recorded matter by just looking at an output bin allotted to the operator.

Moreover, as shown in FIG. 7, by providing the data searching section 89 for searching image information data, it is possible to speed up the search of the target recorded matter. At this time, if an output bin storing the recorded matter is simultaneously displayed, the process of finding the output bin is eliminated and the recorded matter is promptly found.

The above description explains a case in which two output bins, namely, the first bin 64 and the second bin 65, are used. Similarly, when a number of output bins are present, it is preferred to provide each output bin with a display section capable of displaying image information data.

When the post-processing apparatus 34 has a plurality of output bins as described above, it is necessary for an operator to look at the display sections of the respective bins in order to know which bin is allotted to the operator. An increase in the number of the output bins causes such a problem that it would take an operator a long time to find the output bin allotted to the operator.

One example of the method for solving this problem is informing an operator of an output bin allotted to the operator by providing the digital image forming apparatus with, for example, a recognizing unit for recognizing the operator, and by displaying in the output display a corresponding output bin based on the result of recognition made by the recognizing unit. As the recognizing unit, it is possible to use any means as long as it can recognize the operator by any methods, for example, inputting an ID (identification) number and reading an ID card. As the output display, it is possible to use any means, for example, the liquid crystal display device 1 of the control panel 190 of the digital image forming apparatus shown in FIG. 5, or the display device mounted on the output bin, if it allows an operator to easily recognize the output bin allotted to the operator.

Figure 8:
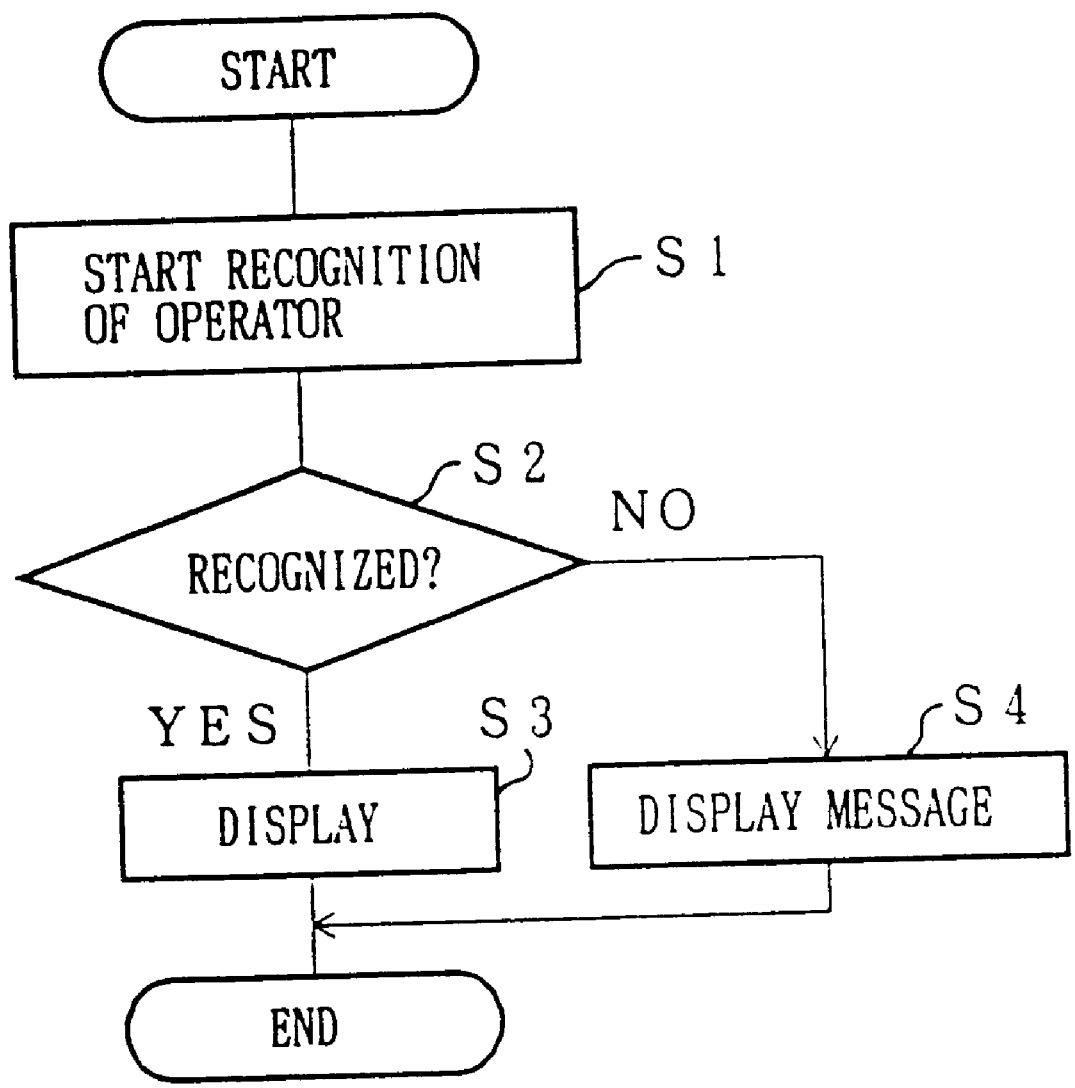
FIG. 8 is a flow chart showing an example of the flow of processing performed by the control system of the post-processing apparatus shown in FIG. 1.

Referring now to FIG. 5 and the flow chart of FIG. 8, the following description will explain the flow of control performed so that an operator can recognize the output bin allotted to the operator. This explanation is made by giving an example where an ID number is input through the control panel 190, and the result of recognition is displayed in the liquid crystal display device 1 of the control panel 190.

First, when an ID number is input by the operator through the control panel 190, the recognition of the operator based on the ID number is started (step S1) Subsequently, it is recognized whether the operator is the one allotted to the output bin of the post-processing apparatus 34 (step S2).

If it is recognized that the operator is the one allotted to the output bin, the corresponding output bin is displayed in the liquid crystal display device 1 of the control panel 190 to inform the operator of the output bin (step S3). On the other hand, if it is recognized in S2 that the operator is not the one allotted to the output bin, this result is displayed in the liquid crystal display device 1 of the control panel 190 so as to inform the operator of the result (step S4).

As described above, when the digital image forming apparatus is provided with means for recognizing an operator, an operator can find an output bin allotted to the operator by simply causing the operator recognizing unit to recognize the operator. Moreover, an operator can promptly have recorded matter sent to the operator based on small volume of information by obtaining the information relating to the recorded matter stored in the output bin.

Next, the post-processing apparatus 34 having a function of displaying image information data relating to recorded matter will be explained in Embodiments 2 to 9 below. In each of these embodiments, as illustrated in FIG. 1, sheets output from the digital image forming apparatus are transported by distributing the sheets to the transport paths corresponding to the respective output bins. This sheet transporting mechanism does not vary depending on the type and number of the output bins. The output bins attached to the post-processing apparatus 34 are explained in the respective embodiments, but the explanation of the internal structure of the post-processing apparatus 34 will be omitted.

It was described that the post-processing operations and display of the post-processing apparatus 34 are controlled by the sorter control unit 78. In the following embodiments, the post-processing operations and display of the post-processing apparatus 34 are also controlled by the sorter control unit 78. Thus, the explanation of the sorter control unit 78 will be omitted.

In the following embodiments, by allotting the recorded matter to the plurality of output bins of the post-processing apparatus 34 in advance depending on the user or the purpose of use (jobs such as printing and fax), the recorded matter is distributed to and stored in the corresponding output bins according to the allotment. The allotment of the jobs to the output bins is input by the operator through an allotting unit. As the allotting unit, it is possible to use, for example, the control panel 190, or other means.

A next embodiment will be explained wherein the post-processing apparatus 34 of the digital image forming apparatus is capable of fixing the allotment in relation to output bins according to a selection made by the operator, or variably changing the allotment depending on the available space in the output bins, and displaying image information data on the output bins according to the change in the allotment. The above-mentioned "allotment" means the distribution of recorded matter output from the digital image forming apparatus to the respective output bins according to the image information data relating to the recorded matter.

Figure 9:
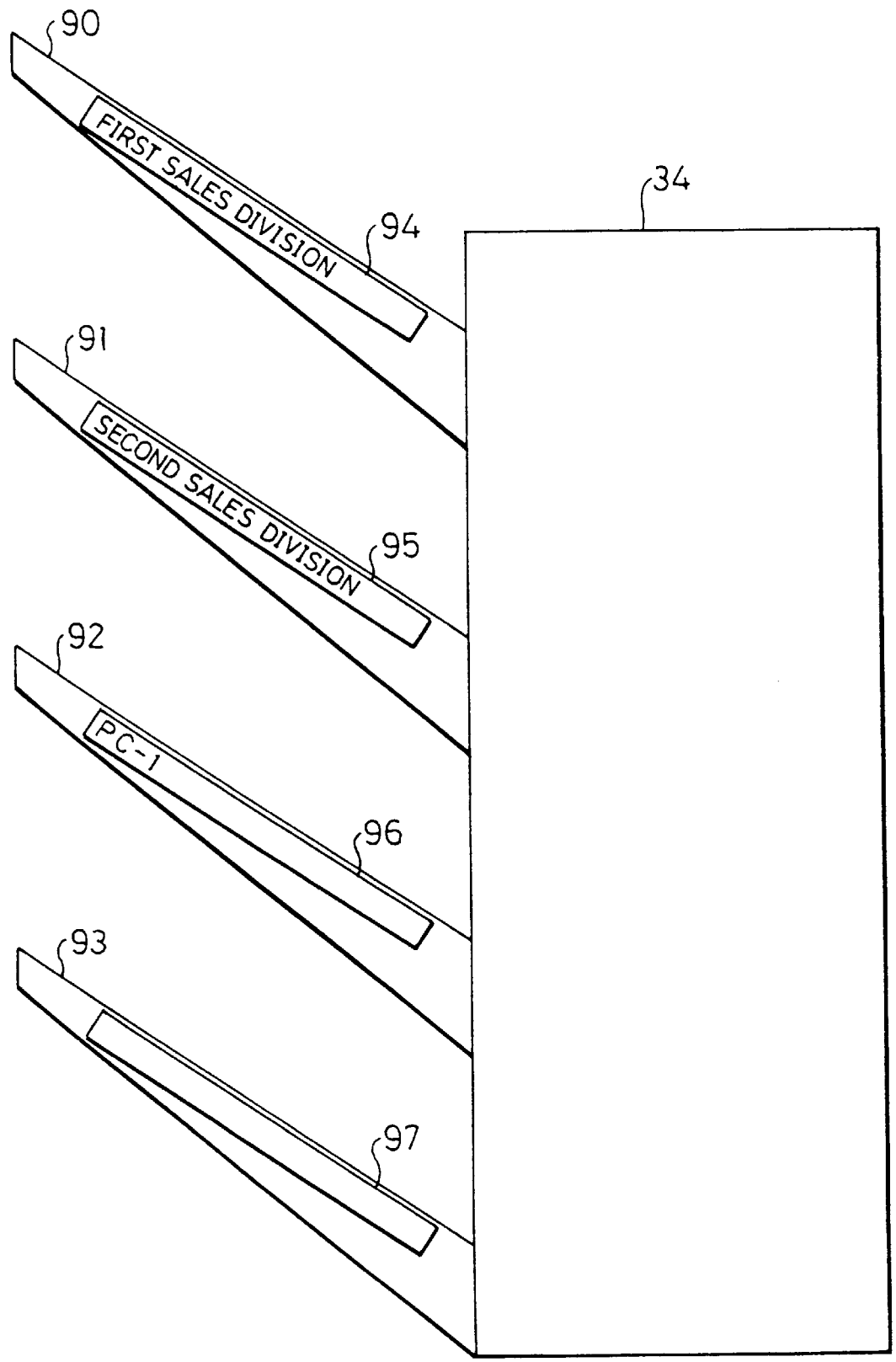
FIG. 9 is a view schematically showing the structure of another post-processing apparatus of the present invention.

As illustrated in FIG. 9, the post-processing apparatus 34 of the digital image forming apparatus of this embodiment includes a plurality of bins. More specifically, the post-processing apparatus 34 includes four output bins, i.e., a first bin 90, a second bin 91, a third bin 92 and a fourth bin 93, having display devices 94, 95, 96 and 97, respectively, as displays for displaying the image information data.

In the post-processing apparatus 34, the allotment of users to the first bin 90 and the second bin 91 is fixed, and the name of the users allotted is displayed in each of the display devices 94 and 95. In FIG. 9, the first sales division is allotted as a user to the first bin 90, and the user's name "FIRST SALES DIVISION" is displayed in the display device 94, while the second sales division is allotted as a user to the second bin 91 and the user's name "SECOND SALES DIVISION" is displayed in the display device 95.

The allotment of users to the third bin 92 and the fourth bin 93 is variably switched according to an output. In FIG. 9, a client "PC-1" is allotted as a user to the third bin 92 and "PC-1" is displayed as the user's name in the display device 96, while no user is allotted to the fourth bin 93 at present and nothing is displayed in the display device 97.

Since the allotment of users to the third bin 92 and the fourth bin 93 is variably switched according to an output, when the recorded matter output to the third bin 92 is removed, another user is allotted to the third bin 93 and the name of the newly allotted user is displayed in the display device 96. For example, when the next user is a client "PC-7", "PC-7" is displayed in the display device 96.

In the above explanation, the name of a division and the name of a client, for example, "FIRST SALES DIVISION" and "PC-7", are displayed. However, the present invention is not necessarily limited to these examples. Namely, for example, the personal name or group name of the user may be displayed.

In the post-processing apparatus 34 of the above-mentioned structure, the display device which is mounted on each output bin to display the image information data can change the display content according to the allotment in relation to the output bins. Therefore, even if the allotment is changed when the post-processing apparatus 34 is in use, the operator can promptly find the recorded matter according to the changed display content.

The following description will discuss the post-processing apparatus 34 of the image forming apparatus, capable of allotting a plurality of jobs to a single output bin.

Figure 10:
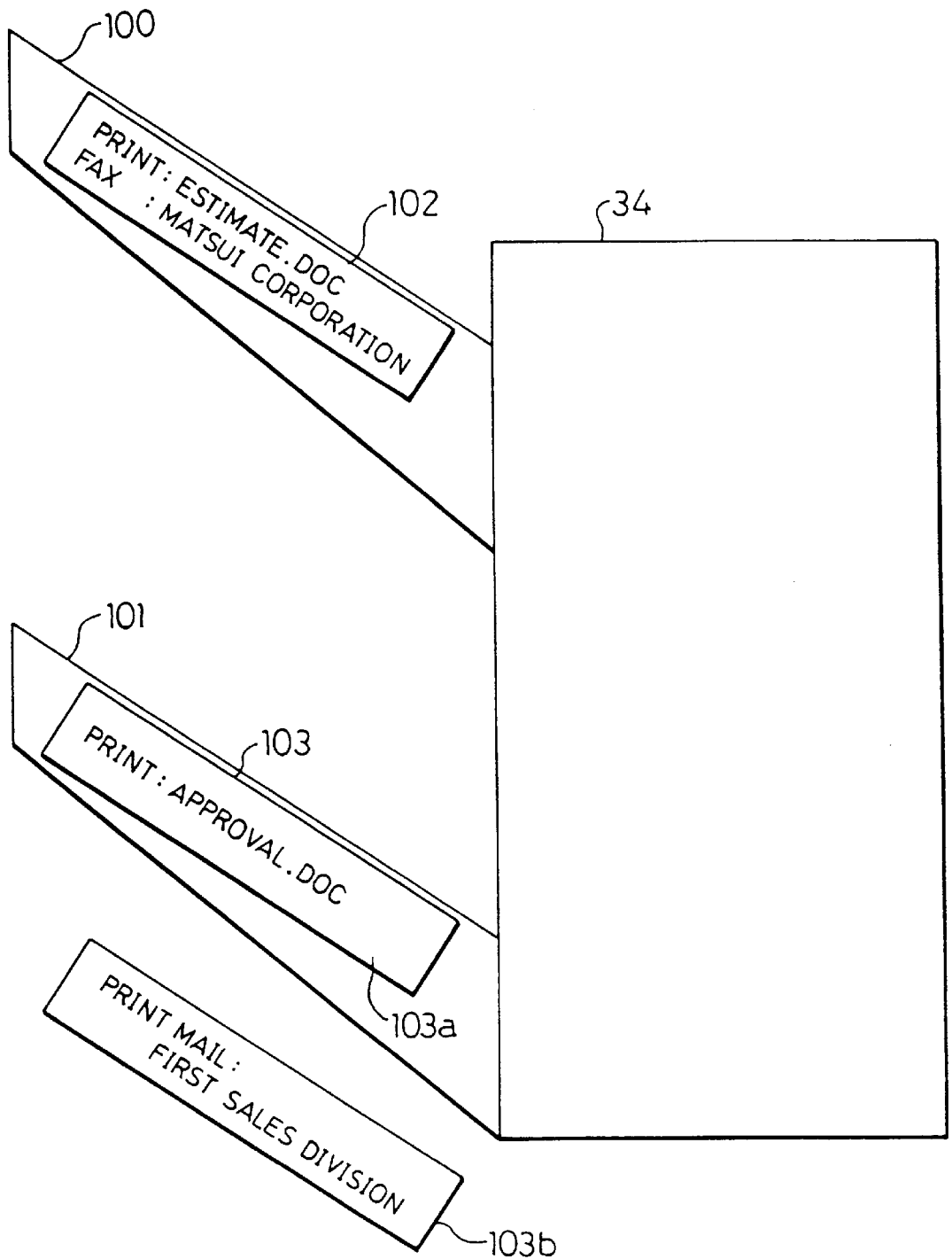
FIG. 10 is a view schematically showing the structure of still another post-processing apparatus of the present invention.

As illustrated in FIG. 10, the post-processing apparatus 34 of this embodiment includes two output bins, i.e., a first bin 100 and a second bin 101, for storing recorded matter. The first bin 100 and the second bin 101 have display devices 102 and 103, respectively, for displaying the image information data relating to the recorded matter.

"PRINT: ESTIMATE. DOC" and "FAX: MATSUI CORPORATION" are displayed in the display device 102 of the first bin 100. The displayed information means that recorded matter with a data name "ESTIMATE. DOC" and a facsimile from Matsui Corporation are stored in the first bin 100. Namely, a plurality of jobs are allotted to a single output bin.

In the display device 102 of the first bin 100, the contents of two kinds of jobs are simultaneously displayed. As a way of displaying the contents of more than one kind (two kinds) of jobs by a single output bin, the display device 103 of the second bin 101 may be used.

The display device 103 of the second bin 101 switches the display content, and displays either of the display contents 103a and 103b. The display content shown in the display device 103 is switched between the display contents 103a and 103b according to an instruction from the control panel 190, etc. For example, if the display content 103a is "PRINT: APPROVAL. DOC" and the display content 103b is "PRINT MAIL: FIRST SALES DIVISION", it is indicated that recorded matter of a data name "APPROVAL. DOC" and a printed mail from the first sales division are stored in the second bin 101. Namely, more than one kind of jobs (i.e., two kinds of jobs) are allotted to a single output bin. The switching of the display content between the display contents 103a and 103b in the display device 103 may be performed by using the control panel 190. Alternatively, it is possible to arrange the display content to be automatically switched between the display contents 103a and 103b at intervals of a predetermined time.

As described above, in the post-processing apparatus 34, even when more than one kind of jobs are allotted to a single output bin and recorded matter corresponding to these jobs are present together, recorded matter corresponding to one job and recorded matter corresponding to another job are separately displayed. It is thus possible to obtain only the information relating to a job being executed, and inform that recorded matter corresponding to a job is stored in the target output bin even when another job is in progress.

The method for storing recorded matter corresponding to more than one kind of jobs in a single output bin is not necessarily limited to the above-mentioned method using the first bin 100 and the second bin 101.

A next embodiment will be explained wherein the post-processing apparatus 34 of the digital image forming apparatus includes a data accumulating unit for accumulating image data and image information data, and displays the output order of image data waiting to be output in the display section of a corresponding output bin based on the image information data in the data accumulating unit when the data accumulating unit contains a plurality of image data waiting to be output. As the data accumulating unit, a part of the memory 73 or a memory installed as a separate member may be used.

Figure 11:
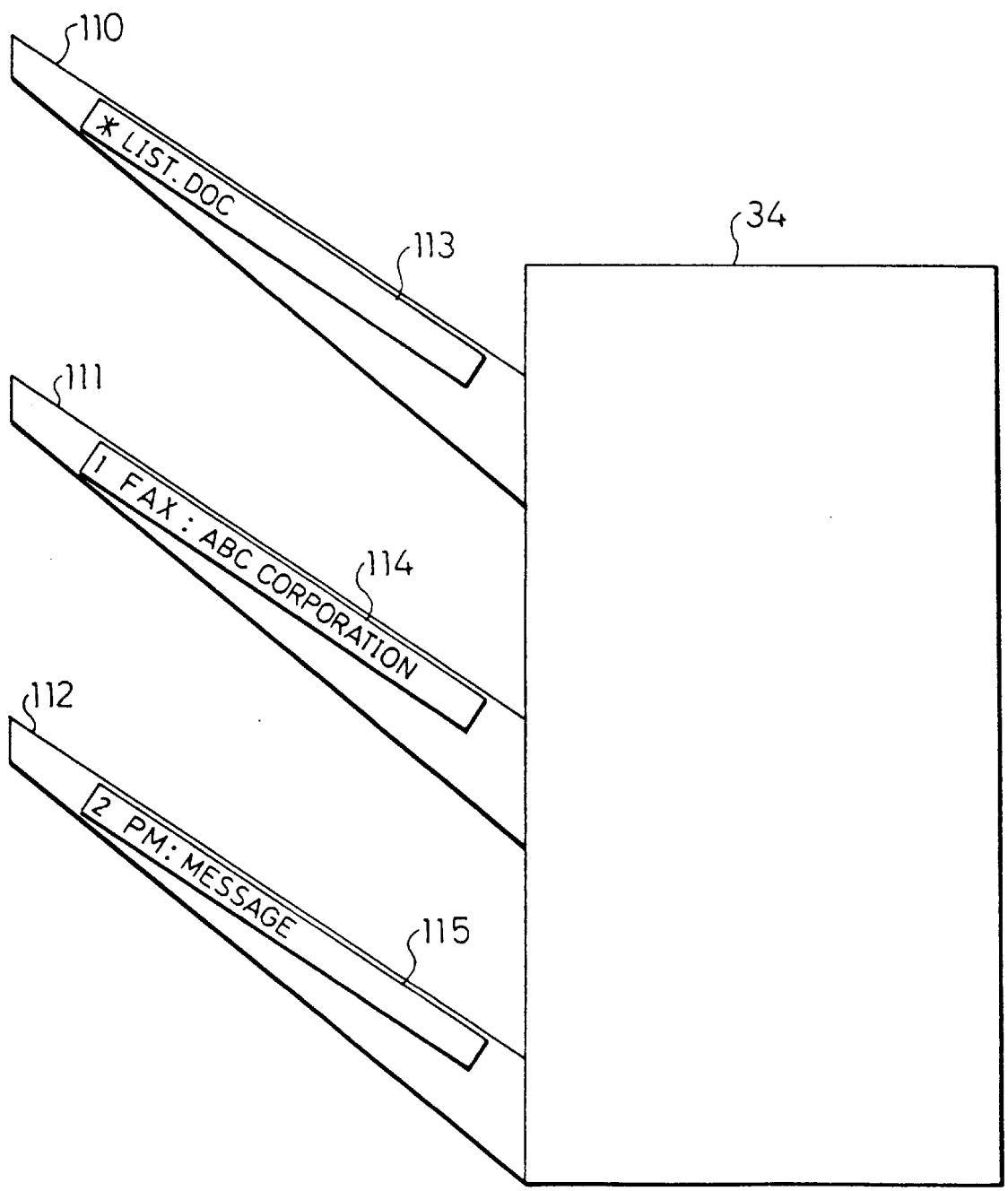
FIG. 11 is a view schematically showing the structure of still another post-processing apparatus of the present invention.

As illustrated in FIG. 11, the post-processing apparatus 34 of the digital image forming apparatus of this embodiment includes three output bins, i.e., a first bin 110, a second bin 111 and a third bin 112, and display devices 113, 114 and 115 mounted on the three output bins, respectively, for displaying the image information data. The output of the recorded matter to the output bins is performed in the order the first bin 110, the second bin 111, and then the third bin 112.

The display devices 113, 114 and 115 display the output order of the recorded matter waiting to be output, based on the image information data of more than one kind of recorded matter allotted to the output bins corresponding to these display devices, respectively.

For example, "* LIST. DOC" is displayed in the display device 113 of the first bin 110. The sign "*" means that outputting has been completed. Namely, it is shown that output recorded matter of a data name "LIST. DOC" is stored in the first bin 110.

"1 FAX: ABC CORPORATION" is displayed in the display device 114 of the second bin 111. "1" is a symbol which means that the data indicated with "1" is to be output first among the whole data in the post-processing apparatus 34. Namely, in the second bin 111, it is displayed that a facsimile from ABC Corporation was output first.

"2 PM: MESSAGE" is displayed in the display device 115 of the third bin 112. "2" on the display is a symbol which means that the data indicated with "2" is to be output second among the whole data in the post-processing apparatus 34. Namely, in the third bin 112, it is displayed that a printed mail (PM) "MESSAGE" was output second.

In this structure, since the output order of recorded matter to be output to the respective bins from the post-processing apparatus 34 is displayed in the display sections of the output bins, it is possible to know the time taken for the target recorded matter to be output. This structure saves the operator from mental pressure caused by waiting for the output of the target recorded matter. Furthermore, such a display on the output bins allows the operator to know which recorded matter is output in which order to which output bin at a glance.

In this embodiment, the output order of recorded matter and the completion of output are displayed as the output state of recorded matter in the respective output bins. However, the operator cannot know the progress of the output of recorded matter to each output bin. Then, the post-processing apparatus 34 capable of displaying the output state in each output bin will be discussed in the next embodiment below.

Figure 12:
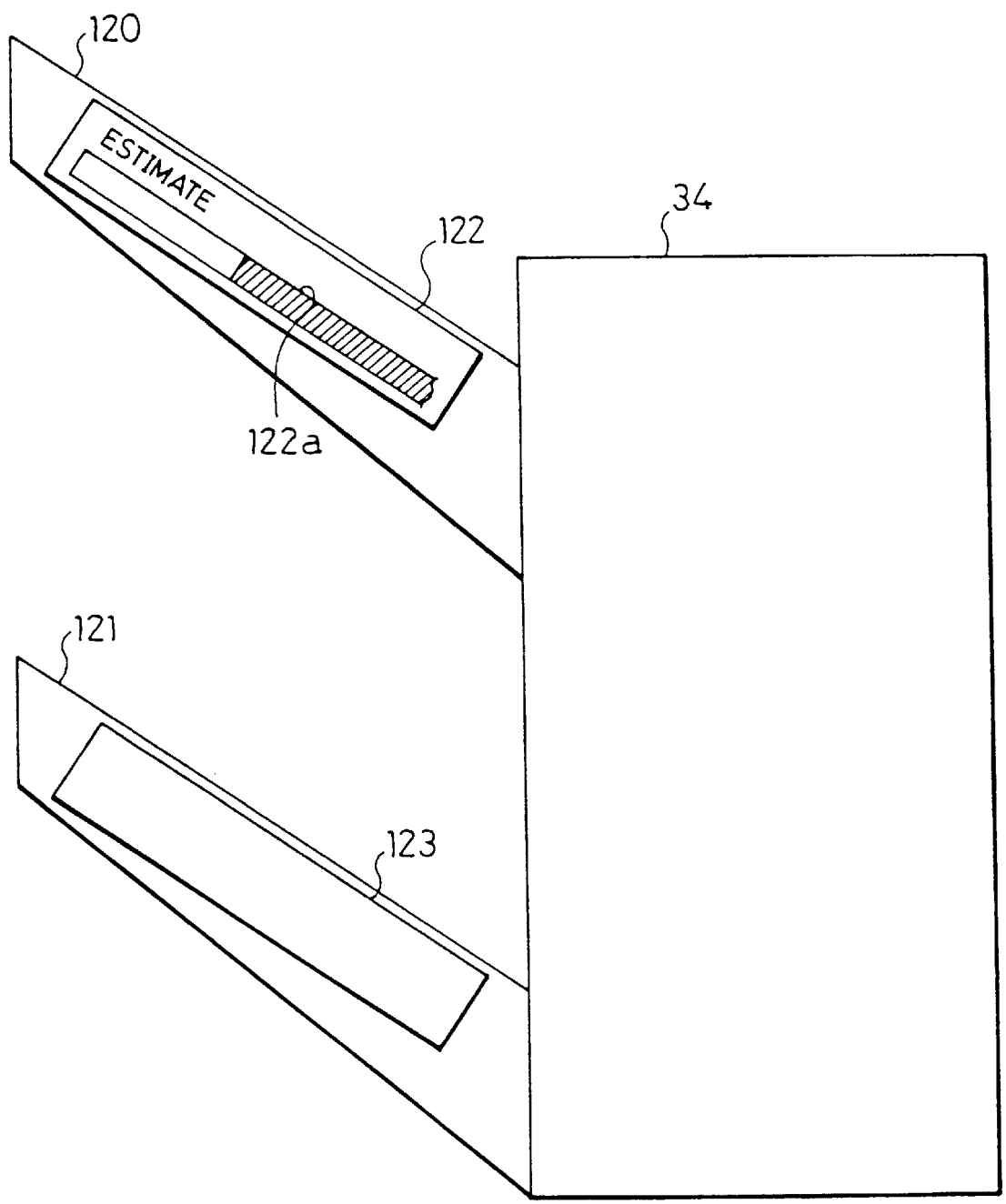
FIG. 12 is a view schematically showing the structure of still another post-processing apparatus of the present invention.

As illustrated in FIG. 12, the post-processing apparatus 34 of the digital image forming apparatus of this embodiment includes two output bins, i.e., a first bin 120 and a second bin 121, and display devices 122 and 123 mounted on the first bin 120 and second bin 121, respectively, for displaying information based on image information data.

The display section 122 includes a bar graph type indicator 122a which shows how far an output of recorded matter being in progress has been completed based on the image information data. The display device 122 also displays image information data relating to recording matter like the second through fourth embodiments above. The display device 123 has the same structure as the display device 122, and therefore the explanation thereof will be omitted.

As shown in FIG. 12, in the display device 122 of the first bin 120, "ESTIMATE" is displayed, and the output state of the recorded matter "ESTIMATE" is indicated with the indicator 122a. Here, the indicator 122a shows that about a half portion of the recorded matter has been output.

On the other hand, nothing is displayed in the display device 123 of the second bin 121. This means that the second bin 121 is not currently used.

As described above, since the output state of the recorded matter can be recognized in real time, it is possible to easily know how much time is necessary for completing the output of target recorded matter. This structure can save the operator from the irritations of waiting for output.

Figure 13:
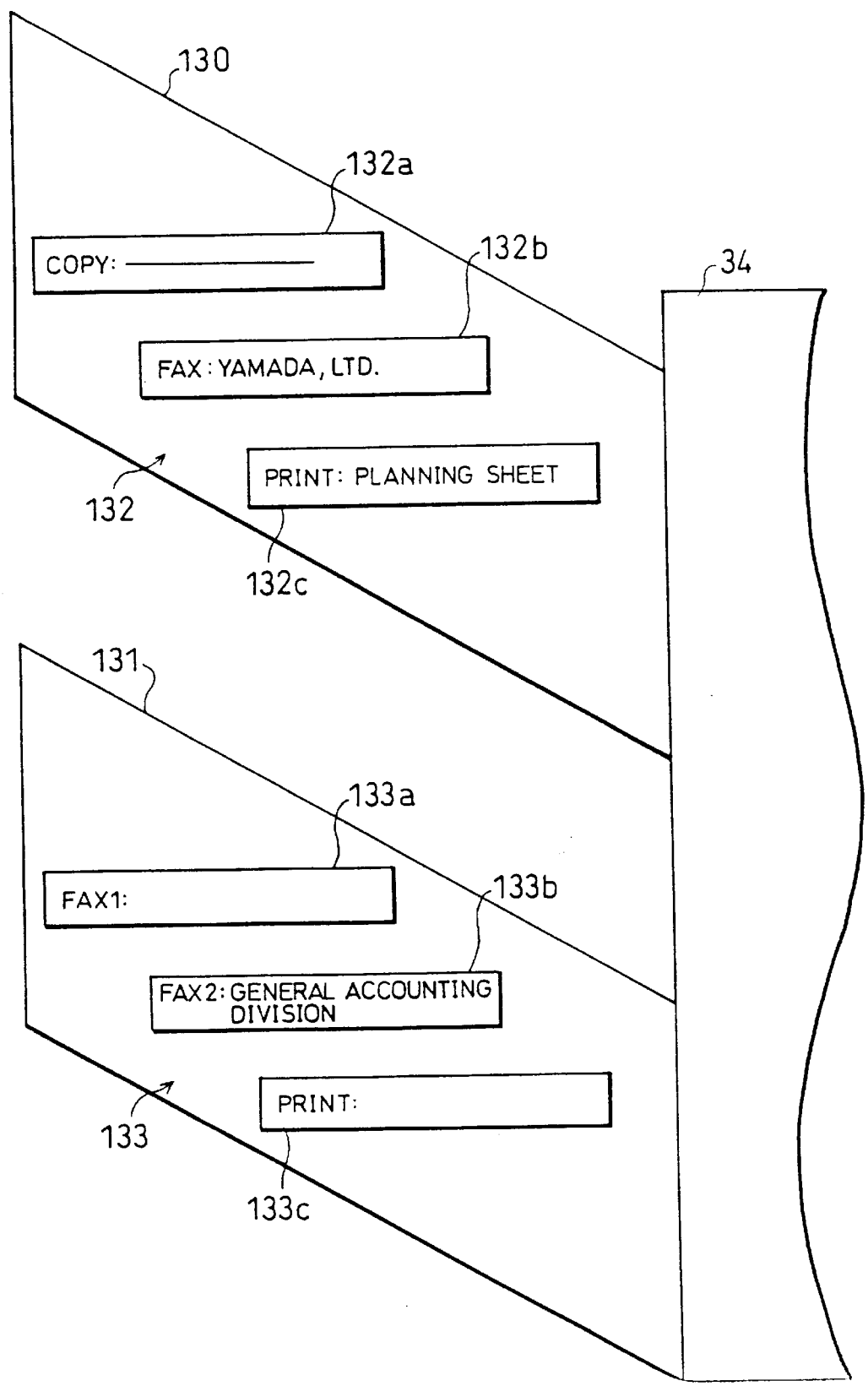
FIG. 13 is a view schematically showing the structure of still another post-processing apparatus of the present invention.

As illustrated in FIG. 13, the post-processing apparatus 34 of the digital image forming apparatus of this embodiment includes two output bins, i.e., a first bin 130 and a second bin 131, and display devices 132 and 133 mounted on the output bins, respectively, for displaying image information data of recorded matter.

The display device 132 has display sections 132a, 132b, and 132c for displaying the contents of jobs allotted thereto. For example, "COPY", "FAX", and "PRINT" are allotted to the display sections 132a, 132b, and 132c, respectively, and the contents of these jobs are displayed in the display sections 132a, 132b, and 132c, respectively. More specifically, since "COPY: —" is displayed in the display section 132a and "FAX: YAMADA, LTD." is displayed in the display section 132b, the display device 132 indicates that recorded matter output by the copy job is not stored and a facsimile from Yamada, Ltd. is stored. Additionally, since "PRINT: PLANNING SHEET" is displayed in the display section 132c, the display device 132 indicates that a printout "PLANNING SHEET" is stored.

Similarly, the display device 133 has display sections 133a, 133b, and 133c for displaying the contents of jobs allotted thereto. For example, "FAX 1" relating to a facsimile sent by an outside line is allotted to the display section 133a. "FAX 2" relating to a facsimile sent through an extension is allotted to the display sections 133b. The contents of these jobs are displayed in the display sections 133a and 133b, respectively. More specifically, since "FAX 1: " is displayed in the display section 133a and "FAX 2: GENERAL ACCOUNTING DIVISION" is displayed in the display section 133b, the display device 133 indicates that no facsimile sent by an outside line is stored and a facsimile sent from the general accounting division through an extension is stored. Moreover, since "PRINT:" is displayed in the display section 133c, the display device 133 indicates that no printout is stored.

The display sections 132a, 132b and 132c, and the display sections 133a, 133b and 133c are disposed so that information is displayed substantially parallel to the installation surface of the post-processing apparatus 34. In this structure, even when a single output bin is provided with a plurality of display devices like the case in which sheets of recorded matter produced by more than one kind of jobs are stored in a single output bin, the operator can easily see the display content.

In the above-mentioned embodiments, the positions of the display devices to be mounted on the output bins are not particularly limited. However, considering the mounting area of the display device, it is preferred to mount the display device substantially parallel to the recorded matter holding surface of the output bin on which the recorded matter is to be placed. By disposing the display device to be substantially parallel to the recorded matter holding surface of the output bin, it is possible to minimize the space for mounting the display device. Consequently, it is possible to ensure a maximum display area without changing the space for mounting the display device.

In the following embodiments, the mounting positions of the display devices for displaying the image information data will be explained.

Figure 14:
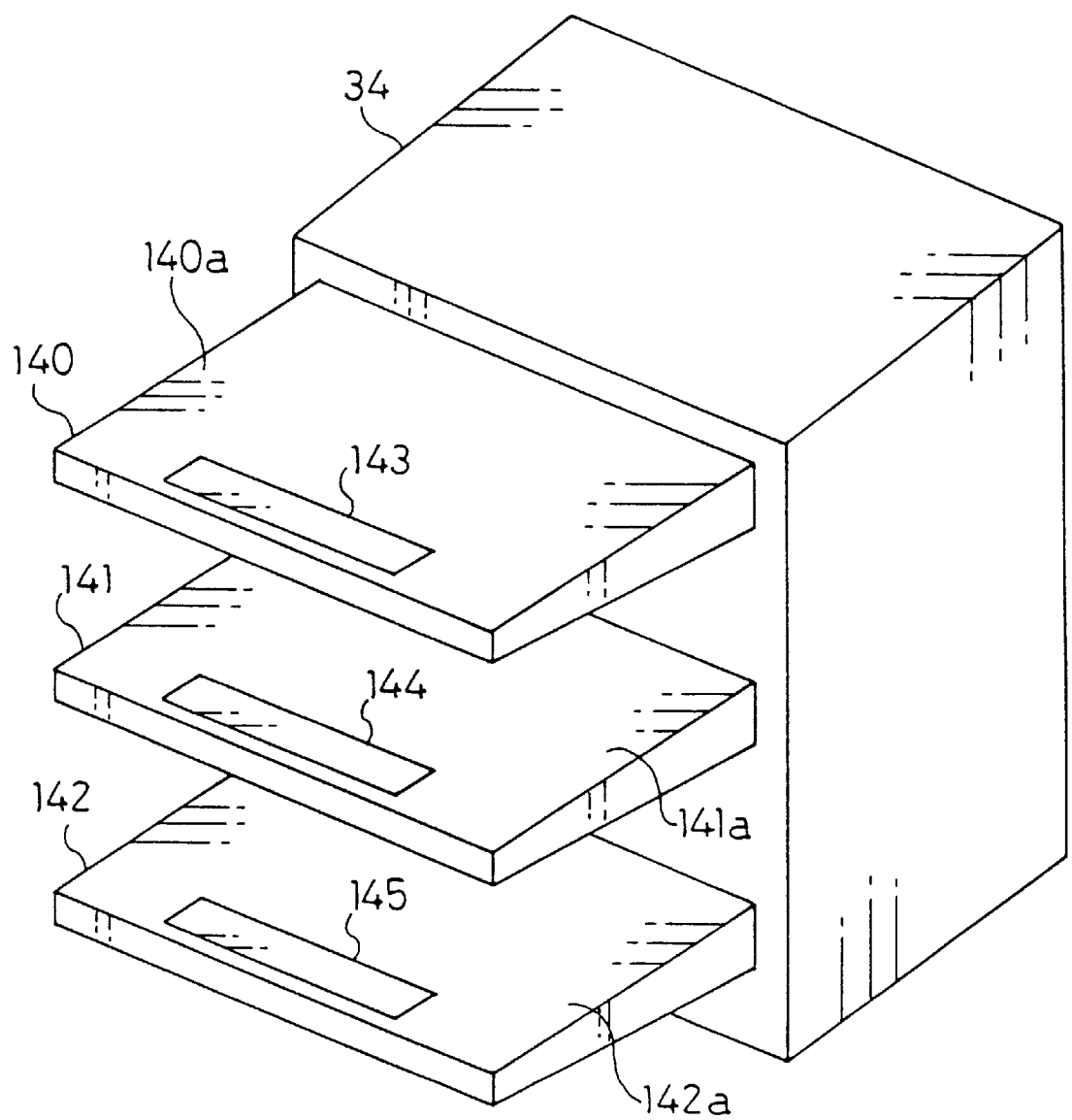
FIG. 14 is a view schematically showing the structure of still another post-processing apparatus of the present invention.

As illustrated in FIG. 14, the post-processing apparatus 34 of the digital image forming apparatus of this embodiment includes three output bins, i.e., a first bin 140, a second bin 141, and a third bin 142.

The output bins have display devices 143, 144 and 145 which are mounted on recorded matter holding surfaces 140a, 141a and 142a, respectively. The display devices 143 to 145 are positioned so that the display devices 143 to 145 are not hidden by recorded matter output to the recorded matter holding surfaces 140a, 141a and 142a and that the operator can see all the display devices 143 to 145 from a position opposite to the output direction from which the recorded matter is discharged from the post-processing apparatus 34.

With this structure, since the respective display devices 143 to 145 are mounted on the recorded matter holding surfaces 140a, 141a and 142a of the respective output bins 140, 141 and 142, it is not necessary for operator to change the posture to see the information relating to the image on recorded matter stored in an output bin positioned on a lower level. Moreover, since the operator can see the display contents of all of the bins at an angle from a higher position opposite to the output direction of recorded matter from the post-processing apparatus 34, the operator can promptly find the target recorded matter.

In this embodiment, since nothing is displayed in the display devices 143, 144 and 145, it is indicated that recorded matter from the digital image forming apparatus is not stored in any of the output bins. The display control of the display devices 143, 144 and 145 are performed in the same manner as in the second through sixth embodiments above, and any of the display control methods can be employed. The same can be said for the following two embodiments discussed below.

Figure 15:
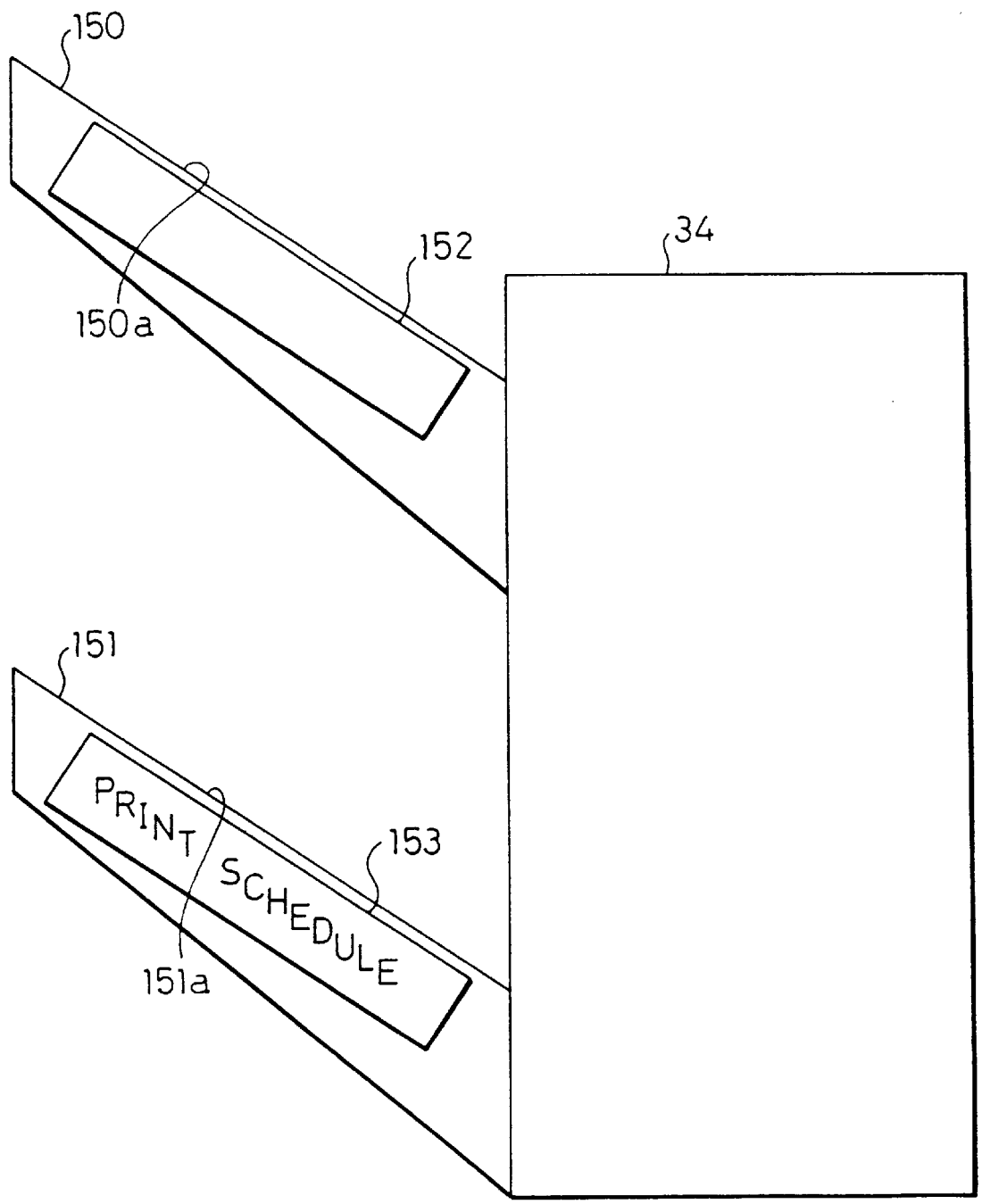
FIG. 15 is a view schematically showing the structure of still another post-processing apparatus of the present invention.

As illustrated in FIG. 15, the post-processing apparatus 34 of the digital image forming apparatus of this embodiment includes two output bins, i.e., a first bin 150 and a second bin 151. These output bins have substantially rectangular display devices 152 and 153, respectively.

The display devices 152 and 153 are arranged substantially parallel to recorded matter holding surfaces 150a and 151a of the respective output bins. However, in each of the display devices 152 and 153, characters are displayed substantially parallel to the installation surface of the post-processing apparatus 34.

In FIG. 15, since nothing is displayed in the display device 152, it is indicated that no recorded matter is stored in the first output bin 150. On the other hand, since "PRINT SCHEDULE" is displayed in the display device 153, it is indicated that a printout "SCHEDULE" is stored in the second output bin 151.

In the display device 153, since the characters are displayed substantially parallel to the installation surface of the post-processing apparatus 34, there is a portion in the display device 153 where no character is displayed. It is therefore not necessary to form the display device 153 in a substantially rectangular or square shape. Namely, the display device 153 can be formed in any shape suitable for the display state of characters.

In this structure, by mounting the display device of each output bin to be substantially parallel to the recorded matter holding surface and by displaying characters to be substantially parallel to the installation surface of the post-processing apparatus 34, it is possible to minimize the mounting area of the display device on the output bin. As a result, a maximum display area is ensured without changing the mounting space, and a display which can be easily seen by the operator is provided.

Figure 16:
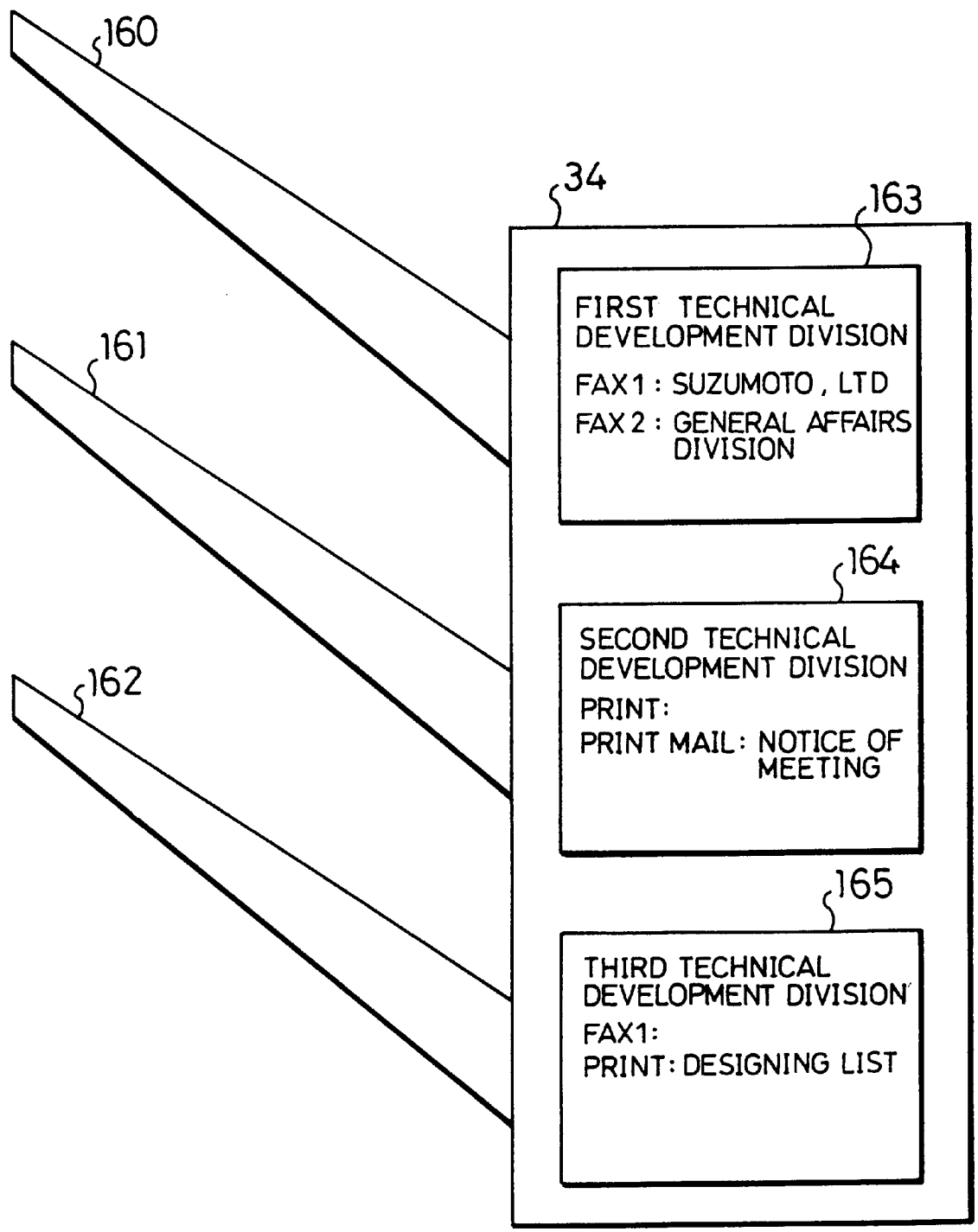
FIG. 16 is a view schematically showing the structure of still another post-processing apparatus of the present invention.

As illustrated in FIG. 16, the post-processing apparatus 34 of the digital image forming apparatus of this embodiment includes three output bins, i.e., a first bin 160, a second bin 161, and a third bin 162. These output bins are formed so that they are movable in upward and downward directions depending on the number of sheets of recorded matter output from the post-processing apparatus 34. The output bins have display devices 163, 164 and 165 for displaying the allotment of jobs to the respective output bins. Since the output bins are movable in the upward and downward directions, the display devices 163, 164 and 165 can display the contents of the corresponding output bins extensively in a vertical direction.

As illustrated in FIG. 16, for example, "FIRST TECHNICAL DEVELOPMENT DIVISION", "SECOND TECHNICAL DEVELOPMENT DIVISION", and "THIRD TECHNICAL DEVELOPMENT DIVISION" are allotted to the first bin 160, second bin 161 and third bin 162, respectively, so that recorded matter addressed to these divisions are stored in the corresponding output bins.

For instance, since "FIRST TECHNICAL DEVELOPMENT DIVISION, FAX 1: SUZUMOTO, LTD., and FAX 2: GENERAL AFFAIRS DIVISION" are displayed in the display device 163, it is indicated that a facsimile sent to the first technical development division from Suzumoto, Ltd. through an outside line and a facsimile sent to the same from the general affairs division through an extension are stored in the first bin 160. Similarly, since "SECOND TECHNICAL DEVELOPMENT DIVISION, PRINT:, and PRINT MAIL: NOTICE OF MEETING" are displayed in the display device 164, it is indicated that no recorded matter has been printed out for the second technical development division and a printed mail "NOTICE OF MEETING" is stored in the second bin 161. Further, since "THIRD TECHNICAL DEVELOPMENT DIVISION, FAX 1:, and PRINT: DESIGNING LIST" are displayed in the display device 165, it is indicated that no facsimile has been sent to the third technical development division through an outside line and a printout "DESIGNING LIST" is stored in the third bin 162. Here, the displayed numbers "1" and "2" mean an outside line and an extension, respectively.

As described above, the display devices for displaying information relating to the recorded matter stored in the respective output bins are mounted on the main body of the post-processing apparatus 34 instead of the corresponding output bins. For example, if the display devices are mounted on the output bins, it is necessary to remove signal lines between the display devices and the post-processing apparatus 34 when removing the output bin for the purpose of packing or maintenance of the post-processing apparatus 34. In contrast, in the structure of this embodiment, since the removal of signal lines is not required, the post-processing apparatus 34 can be easily handled.

The above-mentioned embodiments explain the post-processing apparatus of the digital image forming apparatus which enables the operator to easily find the target recorded matter by displaying image information data belonging to the recorded matter formed by the digital image forming apparatus, such as the sender of facsimile, the name of data and the name of client who output data.

The following embodiments will explain a post-processing apparatus of a digital image forming apparatus, which enables the operator to easily find the target recorded matter by providing the operator with various information relating to the output bins of the post-processing apparatus with the display of information, such as information indicating whether or not recorded matter is stored in the output bins for temporarily storing recorded matter formed by the digital image forming apparatus, and information relating to the recorded matter stored in the output bins, for example, the sender of facsimile, the name of data, and the name of client who output data.

In the following embodiments, the same digital image forming apparatus as the digital image forming apparatus of the first embodiment will be used, and therefore the explanation thereof will be omitted for the sake of convenience.

Figure 17:
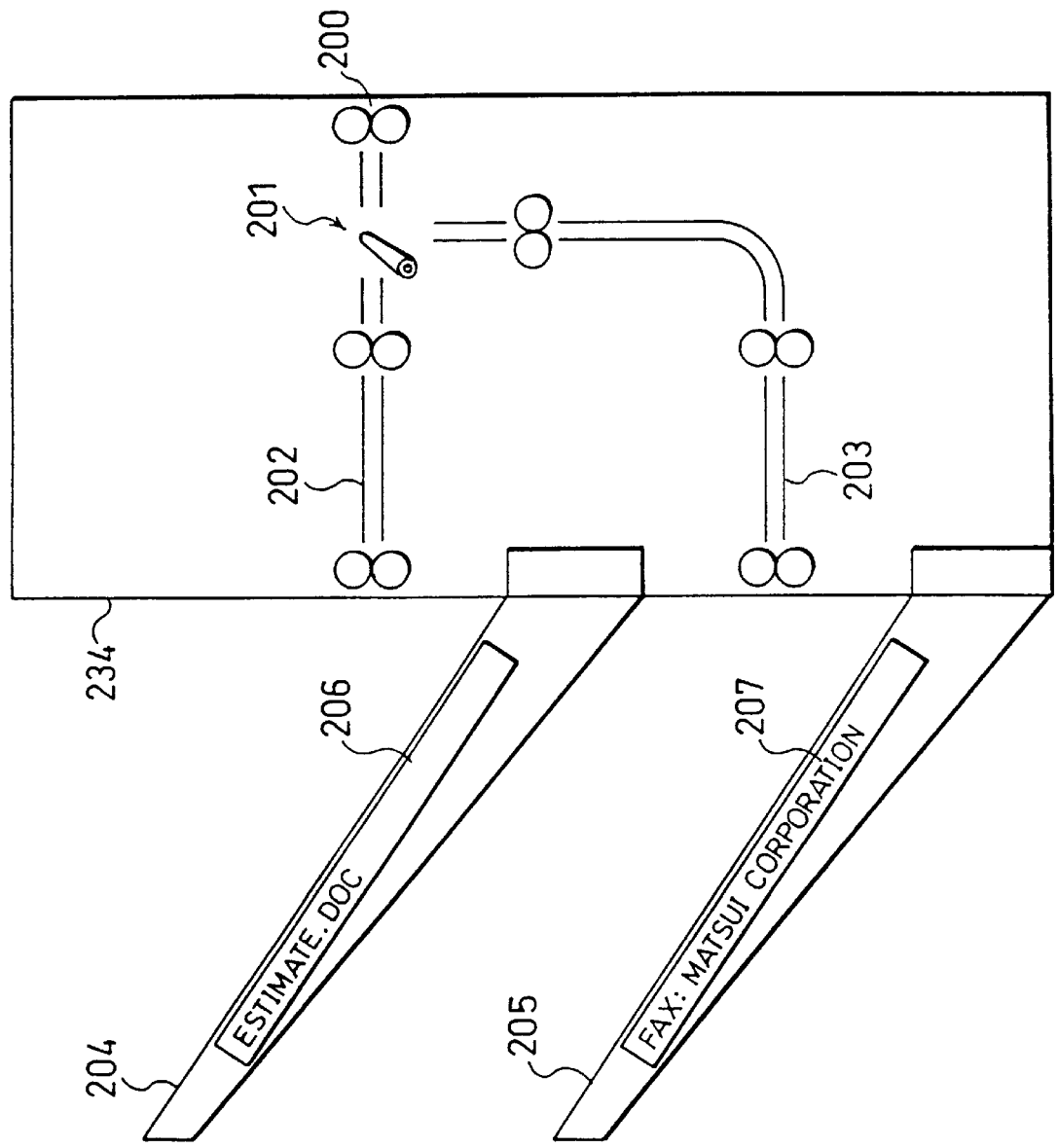
FIG. 17 is a view schematically showing the structure of a post-processing apparatus of another digital image forming apparatus of the present invention.

As illustrated in FIG. 17, a post-processing apparatus 234 of a digital image forming apparatus of this embodiment includes a sheet receiving opening 200 for receiving sheets output from the sheet discharge opening 57 of the digital image forming apparatus 30 shown in FIG. 2, a first sheet transport path 202 for transporting a sheet guided by the sheet receiving opening 200, a second sheet transport path 203, and a transport direction switch 201 for distributing sheets from the sheet receiving opening 200 either to the first sheet transport path 202 or the second sheet transport path 203 by switching the transport direction. The switching control of the transport direction switch 201 is performed by a sorter control unit 78 shown in FIG. 4 based on the control signal from the PCU 74.

Moreover, the post-processing apparatus 234 includes a first bin 204 for storing sheets output from the first sheet transport path 202, and a second bin 205 for storing sheets discharged from the second sheet transport path 203.

In the structure of the post-processing apparatus 234, the transport direction of a sheet received through the sheet receiving opening 200 is determined by the transport direction switch 201, and then the sheet is guided in an appropriate direction according the determined transport direction.

The sheet whose transport direction has been determined by the transport direction switch 201 passes through either the first sheet transport path 202 or the second sheet transport path 203, and is output to the first bin 204 or the second bin 205.

The first bin 204 and the second bin 205 are provided with display devices 206 and 207, respectively, for displaying information relating to the output bins, such as information indicating the presence of recorded matter, and data relating to the image belonging to recorded matter stored in the output bins (hereinafter referred to as the image information data), for example, the sender of facsimile, the name of data, the name of client, the name of person, and the name of division.

The distribution of recorded matter to the first bin 204 and the second bin 205 is performed according to the image information data. There are various distribution methods, and the distribution of recorded matter is performed by the operator using the control panel 190 shown in FIG. 5 as the need arises.

For example, the distribution of recorded matter can be performed by the operator using the control panel 190 as shown in FIG. 5. Specifically, in the post-processing apparatus 234, when recorded matter of data name "ESTIMATE. DOC" is assigned to the first bin 204 and a facsimile from Matsui Corporation is assigned to the second bin 205, "ESTIMATE. DOC." is displayed in the display device 206, and "FAX: MATSUI CORPORATION" is displayed in the display device 207. Namely, it is indicated that recorded matter of data name "ESTIMATE. DOC" and a facsimile from Matsui Corporation are stored in the first bin 204 and the second bin 205, respectively, as recorded matter from the digital image forming apparatus.

For example, liquid crystal display (LCD) panels or plasma display panels (PDP) are used for the display sections of the display devices 206 and 207. However, it is not necessary to limit the display devices 206 and 207 to these panels, and any dot-matrix type display devices capable of displaying image information data, for example, character information and simple symbols, can be used.

In this structure, since the output order of recorded matter to be discharged from the post-processing apparatus 234 to the output bins is displayed in the display devices 206 and 207 of the output bins, it is possible to know the time taken for outputting the target recorded matter. Thus, this structure can save the operator from mental pressures caused by waiting for the output of the target recorded matter. Moreover, the display of the output order on the output bins enables the operator to know which operator's recorded matter is output in which order to the output bins at a glance.

The post-processing apparatus 234 having two output bins, i.e., first bins 204 and second bin 205, has been explained. Similarly, in the case when the post-processing apparatus 234 includes more than two output bins, it is preferred to provide each bin with a display section capable of displaying image information data.

In general, the height of the post-processing apparatus is lower than the eye level of the operator. Therefore, when a plurality of output bins are arranged in a vertical direction, it is difficult for the operator to see the display devices of all the output bins at a glance. Therefore, this structure causes such a problem that the operator must bend or move to a position distant from the display device to look at the display section of the output bin positioned on a lower level of the post-processing apparatus 234.

It is considered to enable the operator to see the display devices of all of the output bins at a time by arranging the screens of the display devices so that the angle between the screen and a plane perpendicular to a surface of the post-processing apparatus 234 to which the display device is attached becomes greater as the position of height of the display device in relation to the post-processing apparatus 234 becomes lower. Namely, the screen of the display device of each output bin is arranged so that the tilt angle of the screen with respect to a direction perpendicular to the surface of the post-processing apparatus 234 to which the display device is attached becomes greater as the position of height of the display device in relation to the post-processing apparatus 234 becomes lower.

Figure 18:
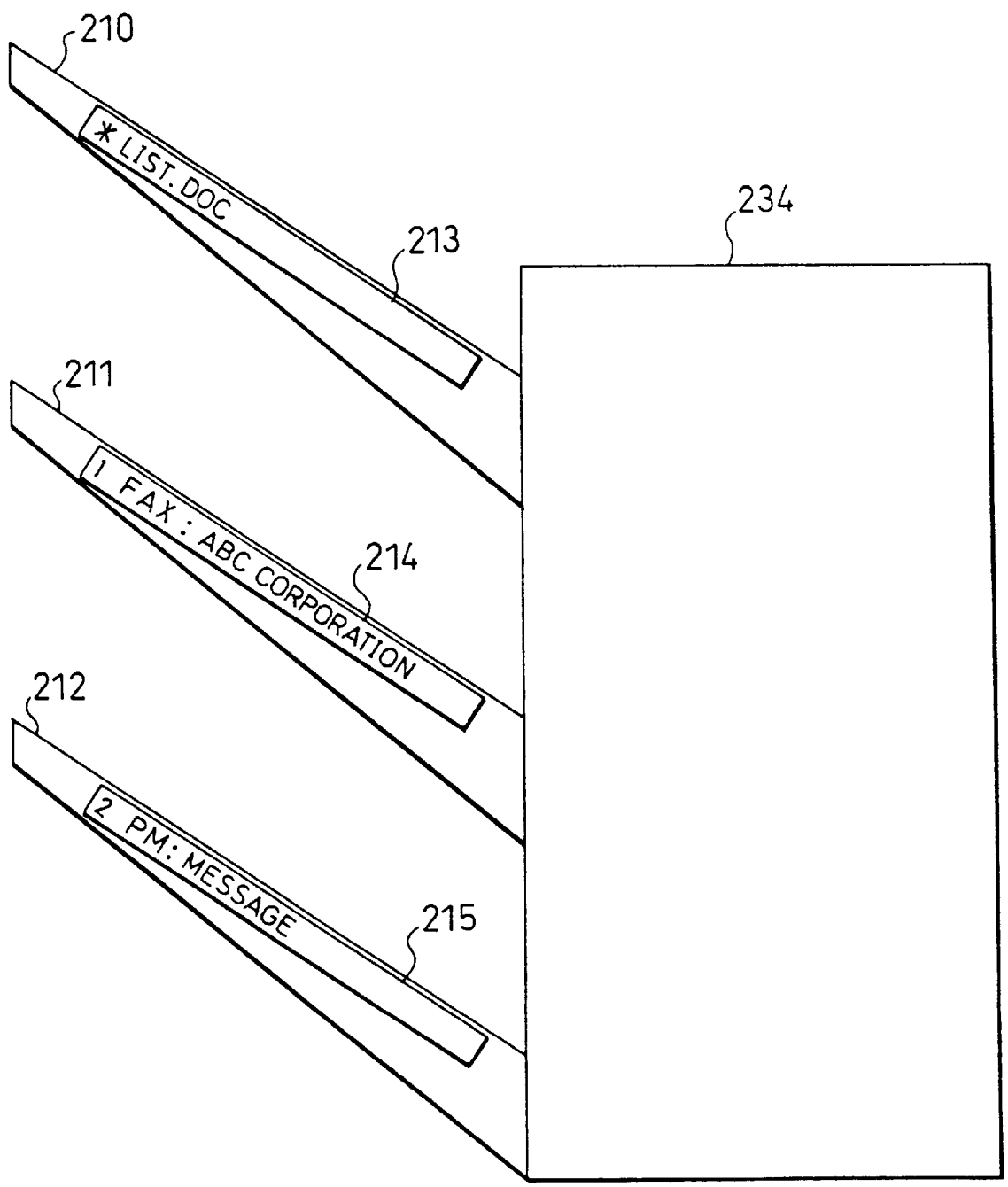
FIG. 18 is a view schematically showing the structure of another post-processing apparatus of the present invention.

As the post-processing apparatus having a plurality of output bins arranged in a vertical direction, for example, a post-processing apparatus having three output bins, i.e., a first bin 210, a second bin 211 and a third bin 212, in a vertical direction as shown in FIG. 18 will be explained.

The first bin 210, second bin 211 and third bin 212 have display devices 213, 214 and 215, respectively, for displaying image information data. For example, "* LIST. DOC" is displayed in the display device 213 of the first bin 210. "1 FAX: ABC CORPORATION" is displayed in the display device 214 of the second bin 211. "2 PM: MESSAGE" is displayed in the display device 215 of the third bin 212. Here, "*" indicates the completion of an output of recorded matter, "1" indicates recorded matter to be output first from the post-processing apparatus 234 on the whole, and "2" indicates recorded matter to be output second from the post-processing apparatus 234 on the whole.

Figure 19:
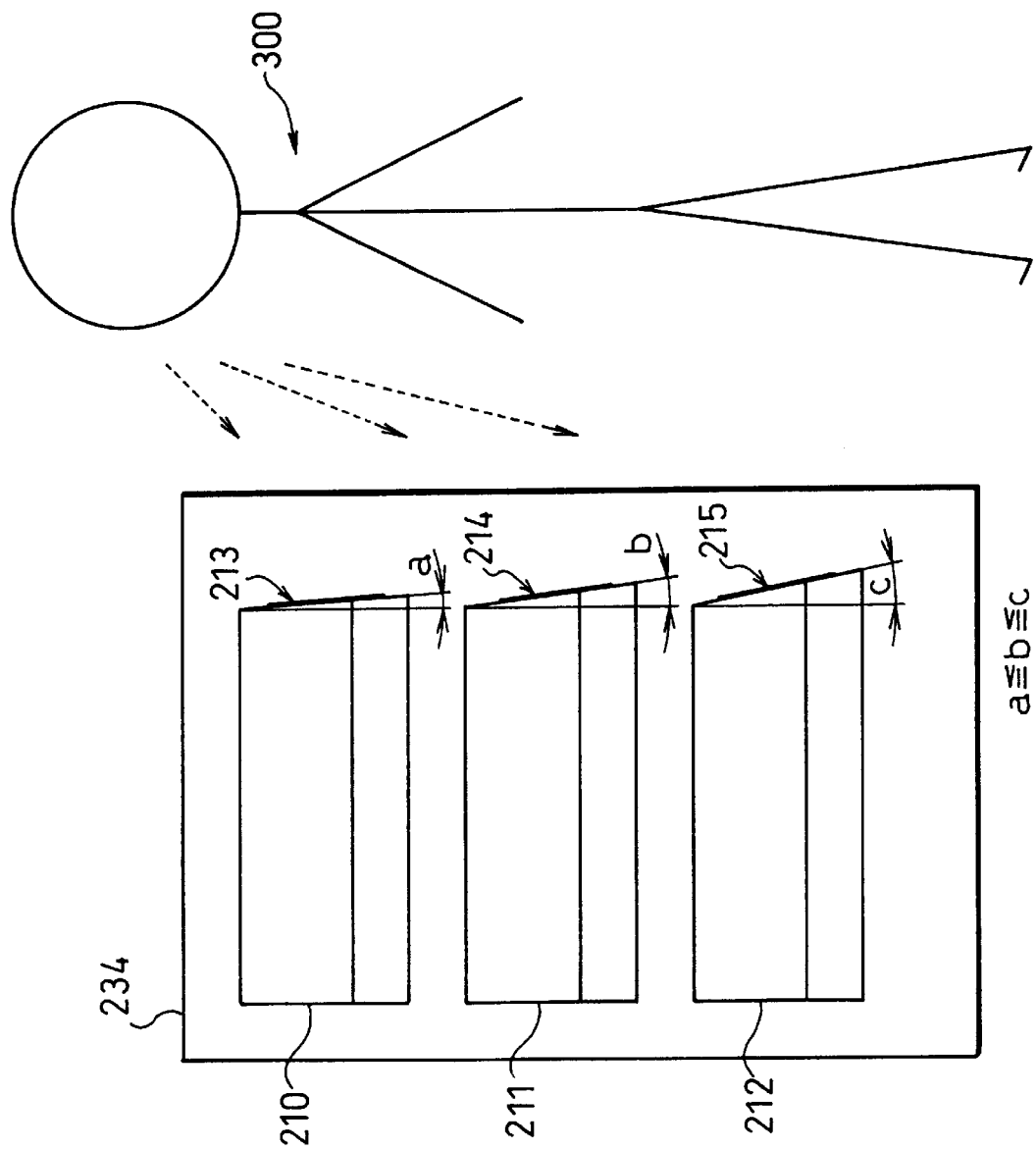
FIG. 19 is a view for explaining how a display mounted on each bin of the post-processing apparatus of FIG. 18 is seen depending on the angle of a screen.

FIG. 19 is a front view of the post-processing apparatus 234 shown in FIG. 18, which is seen from a position opposite to the recorded matter output side. The display device 213 is mounted so that the screen thereof and a plane perpendicular to a surface of the post-processing apparatus 234 to which the display device 213 is attached form an angle a. Similarly, the display devices 214 and 215 are mounted so that the screens thereof and the plane perpendicular to the surface of the post-processing apparatus 234 to which the display devices 214 and 215 are attached form angles b and c, respectively. In this case, the angles a, b and c satisfy the relationship a≦b≦c.

Thus, as shown in FIG. 19, as the position of height of the display device in relation to the post-processing apparatus 234 becomes lower, the angle between the screen and the plane perpendicular to the surface of the post-processing apparatus 234 to which the display device is attached becomes greater. Hence, an operator 300 can easily see the display devices 213 to 215 from a higher position at an angle. Therefore, when the post-processing apparatus 234 has a plurality of output bins, the operator can see the display devices of all of the output bins at a glance in a normal operation state.

In the above explanation, the post-processing apparatus 234 having three output bins was explained. Similarly, in a post-processing apparatus having a plurality of output bins, the same effect as the above-explained post-processing apparatus 234 can be produced by increasing the angle between the screen of the output bin and the plane perpendicular to the surface of the post-processing apparatus 234 to which the display device is attached as the position of height of the display device in relation to the post-processing apparatus 234 becomes lower.

Moreover, when the volume of data of image information displayed in the display device becomes greater than a data displayable area on the screen of the display device, the content which can be displayed in the display device at a time is limited. In this case, for example, by scrolling the screen, it would be possible to display image information data which could not have been accommodated within the screen.

Figure 20:
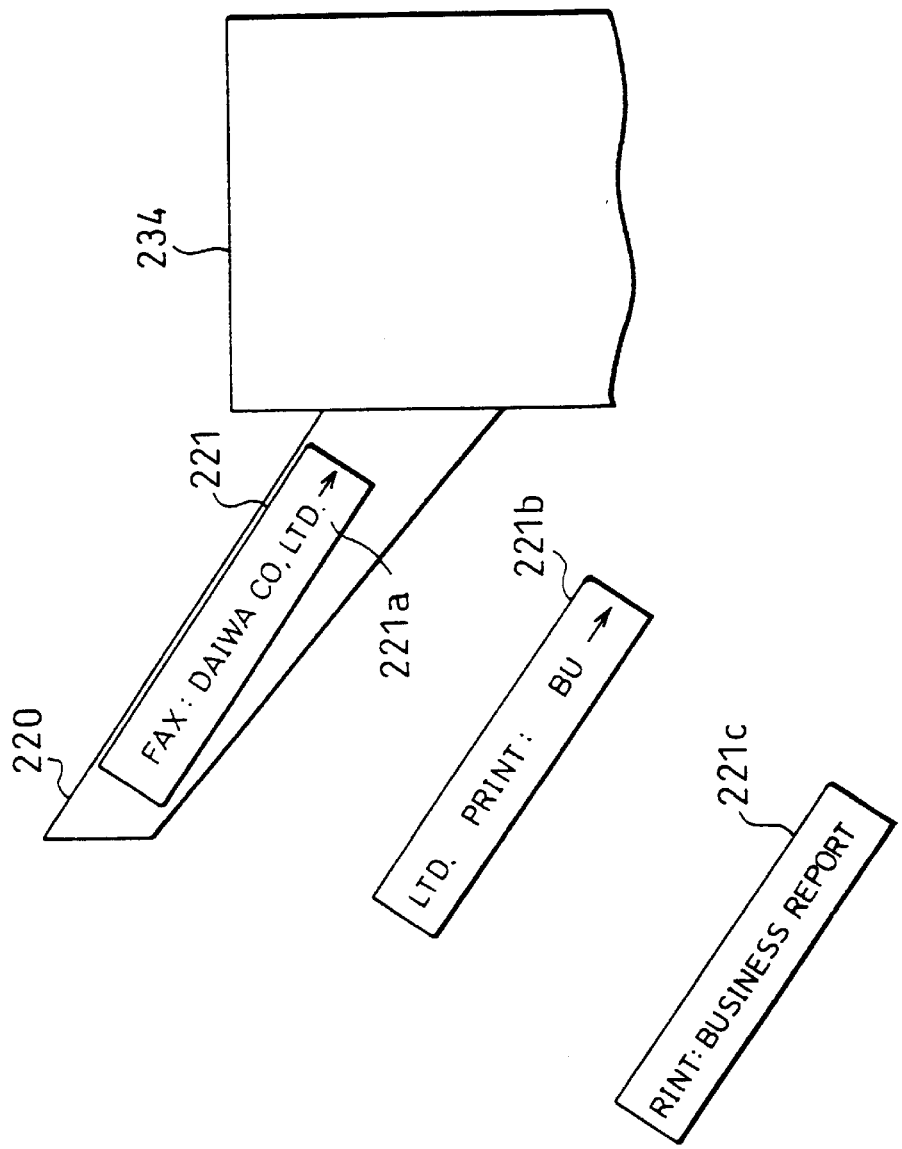
FIG. 20 is a view for explaining the display control performed by controlling the display with a scroller of another post-processing apparatus of the present invention.

Referring now to FIG. 20, the following description will discuss the scrolling of the screen.

As illustrated in FIG. 20, image information data to be displayed in the display device 221 of the output bin 220 as one of the output bins of the post-processing apparatus 234 is scrolled to show the display contents 221a, 221b, and 221c in this order.

In FIG. 20, it is indicated that a facsimile from Daiwa, Ltd. and a printout "BUSINESS REPORT" are stored in the output bin 220. Here, the display device 221 first displays the display content 221a "FAX: DAIWA, LTD.→". The symbol "→" means that there is information that follows the display content 221a. When a predetermined time has elapsed after the display of the display content 221a, the display content 221b "LTD. PRINT: BU→" is displayed. When the predetermined time has elapsed, scrolling automatically starts to show the display content 221c "RINT: BUSINESS REPORT". When the display content 221c is displayed, the display of the whole image information data has been completed. Thereafter, the display device 221 again displays the display content 221a, and repeatedly displays the display contents 221b, 221c, 221a. . . in sequence until the recorded matter stored in the output bin 220 has been removed.

The scrolling of the display contents 221a to 221c is performed after the predetermined time has elapsed in the above explanation. However, the initiation of scrolling is not necessarily limited to the one mentioned above. For example, the operator may manually perform scrolling using the control panel 190 (FIG. 5). Furthermore, in the display device 221, there are some stages of display state between successive display contents, 221a, 221b, 221c. Namely, one display content is not suddenly switched to another display content on the screen.

As described above, by scrolling the display content on the screen of the display device, it is possible to display all the image information data which cannot be accommodated within the screen. In this structure, since the image information data of recorded matter stored in the output bin can be fully displayed with a small display device, the mounting space of the display device can be effectively used.

Figure 21:
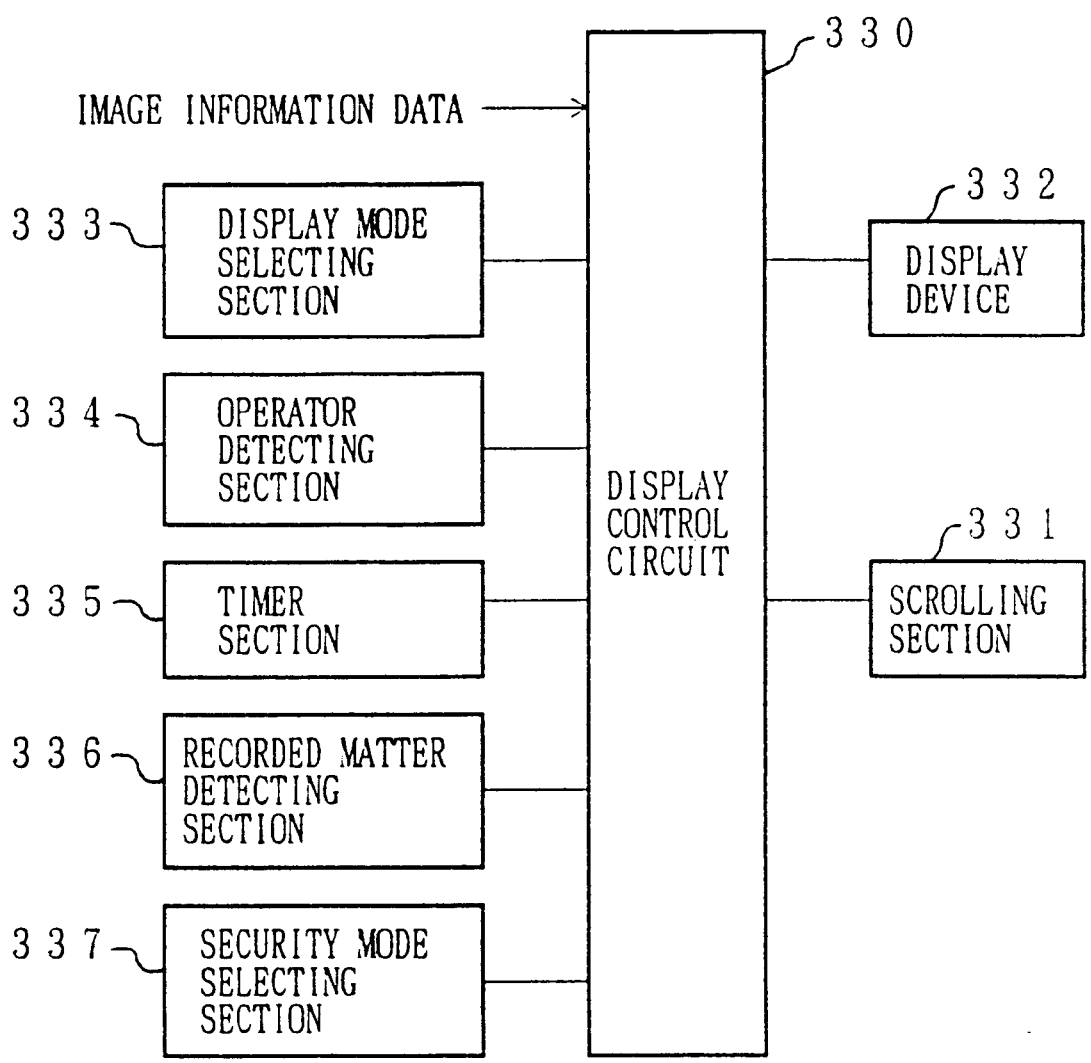
FIG. 21 is a block diagram of the display controller in the post-processing apparatus of the present invention.

As illustrated in FIG. 21, the scrolling of the display content is performed by a scrolling section 331 as a scroller connected to a display control circuit 330 as display controller. More specifically, when the length of the display content corresponding to input image information data is longer than the displayable area on the screen of the display device 332 as a display, the display control circuit 330 controls the scrolling section 331 to scroll the display content on the screen of the display device 332. As the display device 332, the above-mentioned display devices 266, 267 (FIG. 17), display devices 213 to 215 (FIG. 18), and display device 221 (FIG. 20) are used.

As illustrated in FIG. 21, connected to the display control circuit 330 are a display mode selecting section 333 as display mode a selector, an operator detecting section 334 as a detector, a timer section 335 as a timer, recorded matter detecting section 336 as a recorded matter detector, and a security mode selecting section 337 as a security mode selector. The display control circuit 330 controls the display of the display device 332 based on signals from the respective sections.

The display mode selecting section 333 selects a display state on the screen of the display device 332. For example, the display mode selecting section 333 enables the display content to be flashed on and off, or displayed in different colors on the screen. As the display mode selecting section 333, the control panel 190 (FIG. 5) of the digital image forming apparatus 30 can be used. However, it is not necessary to limit the display mode selecting section 333 to the control panel 190.

The operator detecting section 334 detects an operator when the operator approaches a predetermined area around the digital image forming apparatus. As the operator detecting section 334, for example, a sensor for detecting the temperature of a human body, or a sensor using the reflection of infrared ray or ultrasonic wave can be used. However, the operator detecting section 334 is not necessarily limited to these sensors.

The timer section 335 starts counting the time upon an output of recorded matter to the post-processing apparatus 234 from the digital image forming apparatus 30. As the timer section 335, a system of adding up the counter by an action clock of the CPU may be used. However, the timer section 335 is not necessarily limited to this system.

The recorded matter detecting section 336 detects whether each output bin of the post-processing apparatus 234 stores recorded matter. As the recorded matter detecting section 336, for example, an actuator type sensor which is usually used in a copying machine may be used, and the existence or non-existence of recorded matter is detected by installing such a sensor in the output bin. It is arranged that the actuator falls to turn the sensor ON at the time recorded matter is present in the output bin and the actuator does not fall to turn the sensor OFF at the time recorded matter is not present in the output bin. In this arrangement, the recorded matter detecting section 336 outputs a signal indicating the existence of recorded matter when the actuator falls and the sensor is ON. However, the recorded matter detecting section 336 is not necessarily limited to such an actuator.

The security mode selecting section 337 selects a display mode capable of preventing the display content in the display device 332, particularly the image information data, from being seen by a third party. In the security mode selecting section 337, when the security mode is selected, the display content which is to be hidden from the third party, for example, the image information data, may be coded or deleted. When the security mode is cancelled, the image information data is normally displayed in the display device 332. As the security mode selecting section 337, the control panel 190 (FIG. 5) may be used. However, it is possible to separately provide another member for selecting the security mode selecting section 337.

The display control of the display device 332 according to signals from the respective means connected to the display control circuit 330 will be explained in the following embodiments below.

Figure 22:
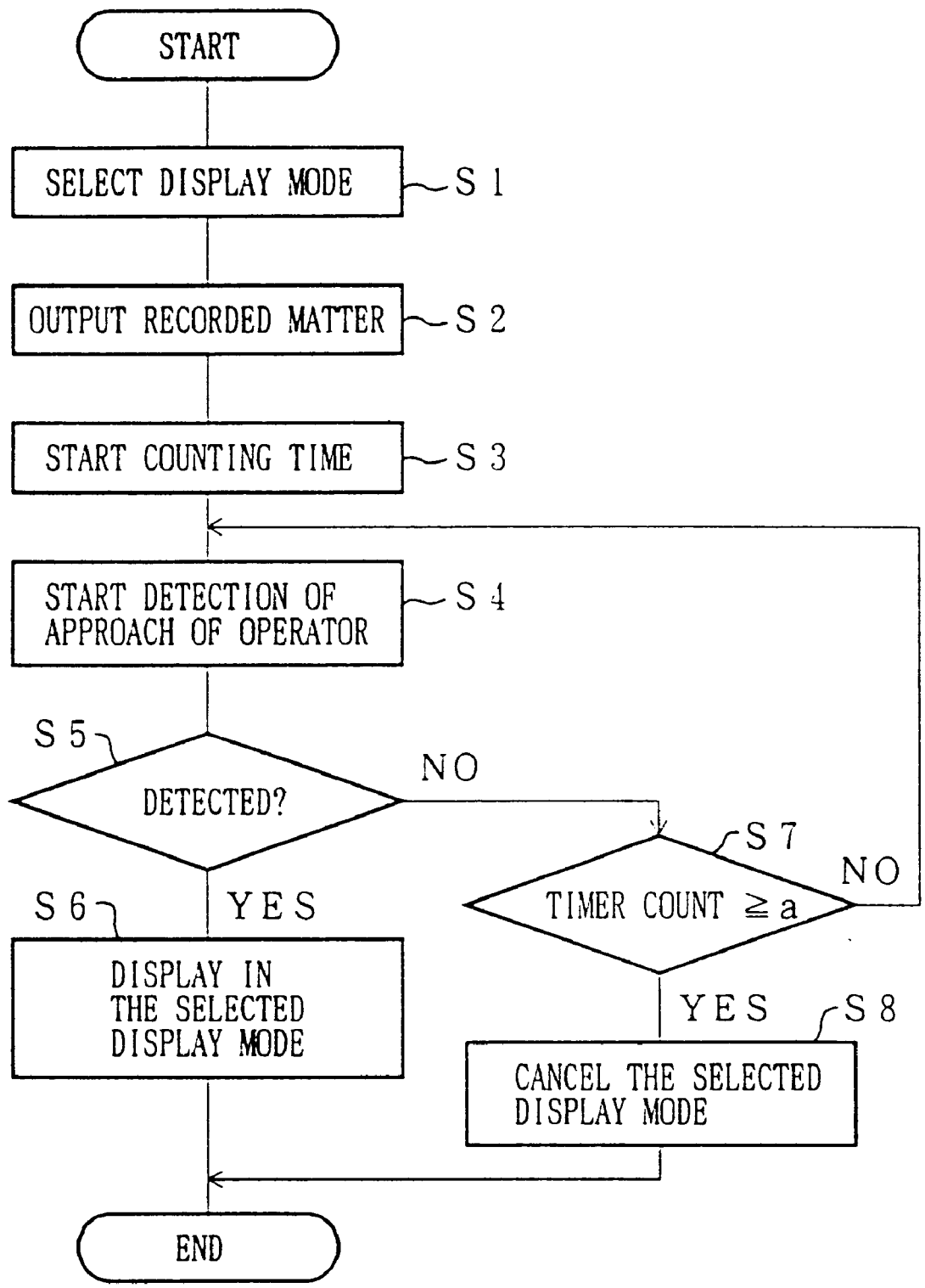
FIG. 22 is a flow chart showing the flow of the display control in the display of the post-processing apparatus of the present invention.

As the display control by the display control circuit 330, this embodiment will discuss how the display device 332 controls the display of image information data according to a display mode selected beforehand by the display mode selecting section 333 when the operator detection section 334 detects that the operator approaches the digital image forming apparatus 30 with reference to the control block diagram of FIG. 21 and the flow chart of FIG. 22.

First, the operator selects a display state for a display content to be displayed in the display device 332 by using, for example, the control panel 190 as the display mode selecting section 333 (step S1). Here, for example, "flashing" is selected, and further a flashing method is selected to flash the display content only twice at an interval of two seconds or repeatedly flash the display content twice at intervals of two seconds. The setup of a display mode with the display mode selecting section 333 can be freely executed by the operator. Namely, the setup of a display mode is not limited to the above-mentioned example.

Next, when the recording matter is output to the post-processing apparatus 234 from the digital image forming apparatus 30 (step S2), the recorded matter detecting section 336 is turned ON, and the timer 335 starts counting the time (step S3).

Subsequently, the operator detecting section 334 starts a detection of an operator approaching the digital image forming apparatus 30 (step S4) As a result, it is determined whether or not the operator has reached the predetermined area around the digital image forming apparatus 30 (step S5). In step S5, if it is detected that the operator has reached the predetermined area around the digital image forming apparatus 30, the display device 332 displays the display content in a display mode selected by the operator in step S1 (step S6).

On the other hand, if it is detected that the operator has not reached the predetermined area around the digital image forming apparatus 30 irrespectively of the initiation of a detection of the operator approaching the digital image forming apparatus 30 in the operator detecting section 334 in step S4, it is judged whether the time counted by the timer section 335 which started counting the time in step S3 has reached a set time a (step S7). When the counted time is shorter than the set time a, the process moves to step S4, and a detection of an operator approaching the digital image forming apparatus 30 is performed again. On the other hand, when the timer count has reached the set time a in step S7, the display mode selected in step Si is cancelled (step S8).

By controlling the display of the display device 332 in the manner mentioned above, the operator can easily find an output bin containing the target recorded matter by simply approaching the predetermined area around the digital image forming apparatus 30 because the display device 332 mounted on the output bin of the post-processing apparatus 234 shows the display content in a particular display mode selected in advance by the operator. Consequently, the operator can easily find the target recorded matter.

Figure 23:
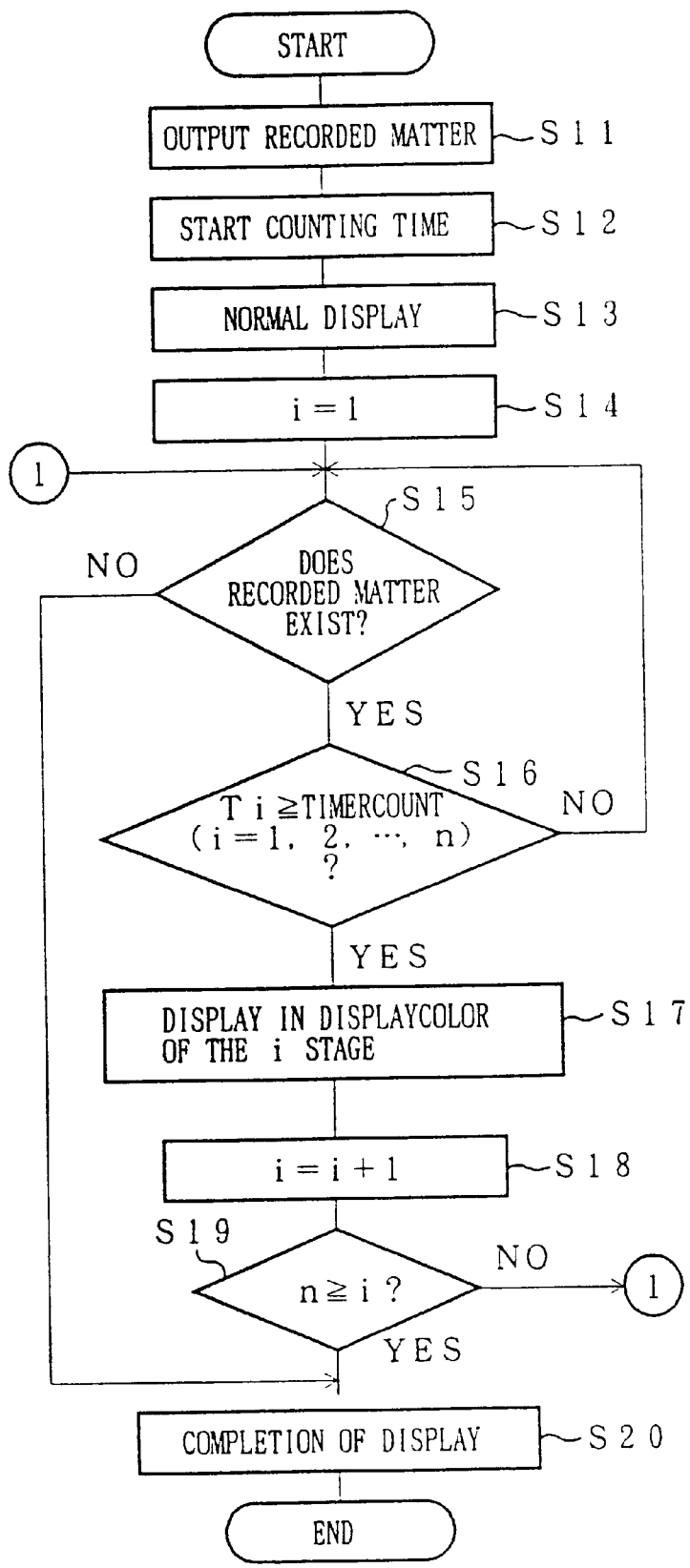
FIG. 23 is a flow chart showing the flow of the display control in the display of another post-processing apparatus of the present invention.

As the display control performed by the display control circuit 330, this embodiment will discuss how the display device 332 changes the display state on the screen depending on the elapsed time counted by the timer section 335 during a detection of recorded matter by means of the recorded matter detecting section 336 with reference to the control block diagram of FIG. 21 and the flow chart of FIG. 23.

First, when the recording matter is output to the post-processing apparatus 234 (step S11), the recorded matter detecting section 336 is turned ON, and the timer 335 starts counting the time (step S12). Subsequently, the display device 332 normally displays a display content (step S13). The display content displayed in the display device 332 at this time is the image information data relating to the output recorded matter. The display device 332 changes the display state according to a value counted by the timer section 335 (hereinafter referred to as the "timer count"). The timer count used for changing the display state is given by $T_i$ ($i=1, 2, 3, \ldots n$ (integers)). In this case, it is necessary to satisfy the relationship $T_i < T_2 < \ldots < T_n$. Namely, the display device 332 changes the display state by stages according to the timer count. Here, an example in which the display color in the display device 332 is changed as a change in the display state will be explained.

Initialization is performed to cause the value of variable i relating to the change in the display state of the display device 332 to be 1 (step S14).

Next, it is judged whether or not the output recorded matter exists in the output bin based on the presence of a signal from the recorded matter detecting section 336 (step S15). If no signal is output from the recorded matter detecting section 336, it is judged that the recorded matter is not present in the output bin, and the process moves to step S20. Then, the display of the image information data relating to the recorded matter in the display device 332 has been completed.

On the other hand, if a signal is output from the recorded matter detecting section 336, it is judged that the recorded matter is present in the output bin, and then it is judged whether the timer count of the timer section 335 is greater than Ti (step S16). If the timer count is smaller than Ti, the process moves to step S15.

Whereas when it is judged in step S16 that the timer count is greater than Ti, the image information data is displayed in a color corresponding to the i stage (step S17). Thereafter, 1 is added to the variable i (step S18).

Next, it is judged whether the variable i is greater than n (step S19). If i is smaller than n, the process moves to step S15, and it is again judged whether the recorded matter exists in the output bin.

On the other hand, if the variable i is greater than n in step S19, the display of the image information data in the display device 332 has been completed irrespectively of the existence or non-existence of the recorded matter in the output bin (step S20).

In the above-mentioned display control, the display color in the display device 332 continues to be changed according to the set time Ti until the recorded matter has been removed from the output bin or a predetermined time Tn has elapsed.

As described above, by changing the display color in the display device 332 at intervals of a predetermined time when the recorded matter is present in the output bin of the post-processing apparatus 234, it is possible to know the time elapsed after the output of the recorded matter. In this structure, the digital image forming apparatus 30 can warn the operator that the output recorded matter has been temporarily stored in the post-processing apparatus 234. Therefore, the recorded matter can be promptly removed by the operator without being left in the output bin.

In the above explanation, changing the display color in the display device 332 depending on the timer count of the timer section 335 was discussed as one example of changing the display state in the display device 332. However, when the display content is arranged to be flashed while shortening the display interval using the timer count of the timer section 335 as another example of changing the display state in the display device 332, it is also possible to give a warning to the operator.

Referring now to the block diagram shown in FIG. 21 and the flow chart shown in FIG. 24, the following description will discuss a display control performed by the display control circuit 330, for preventing the contents of recorded matter output to the post-processing apparatus 234 from being seen by a third party or a person other than the operator. Namely, the display control circuit 330 controls the display state of the image information data in the display device to change depending on whether the security mode is selected by the security mode selecting section 337.

More specifically, when recorded matter is output to the post-processing apparatus 234 (step S31), the security mode can be selected through the security mode selecting section 337 according to a signal from the recorded matter detecting section 336 (step S32). Then, it is judged whether the security mode has been selected (step S33). If the security mode has not been selected, the process moves to step S35, and the image information data relating to the recorded matter stored in the output bin is displayed in the display device 332.

On the other hand, if the security mode was not selected in step S33, the image information data to be displayed in the display device 332 is changed (step S34), and the changed image information data is displayed in the display device 332 in step S35. When the security mode is selected through the security mode selecting section 337, the image information data is changed, for example, into a form in which the image information data itself is not present, or into codes.

With this control, when recorded matter is output to the post-processing apparatus 234, it is possible to hide from a third party the information relating to the recorded matter output to the post-processing apparatus 234, for example, information such as the sender of facsimile and the name of client by not displaying the image information data relating to the recorded matter or displaying the coded image information data. Therefore, among the information of the recorded matter output to the post-processing apparatus 234, the information which should not been seen by the third party can be made a secret.

In the above explanation, when the security mode is selected through the security mode selecting section 337, the image information data relating to secret recorded matter is directly changed. However, the present invention is not limited to this example. For example, it is possible to perform a control under which the image information data may be converted into completely different image information data and displayed if the image information data is kept hidden from the third party.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter; and display means for displaying image information data relating to the recorded matter stored in said bins, in connection with said bins and according to a time elapsed.

2. The post-processing apparatus of the digital image forming apparatus according to claim 1, wherein each of said bins is provided with said display means.

3. The post-processing apparatus of the digital image forming apparatus according to claim 1, further comprising allotting means for determining an allotment in relation to said bins, wherein said display means displays image information data relating to recorded matter corresponding to the allotment determined by said allotting means.

4. The post-processing apparatus of the digital image forming apparatus according to claim 1, further comprising information extracting means for extracting information relating to a sender of an output, such as a name of a client who output an image and a sender of a facsimile, from the image information data, wherein said display means displays the information extracted by said information extracting means.

5. The post-processing apparatus of the digital image forming apparatus according to claim 1, wherein, when more than one kind of recorded matter is output to one of said bins, said display means separately displays each kind of the recorded matter.

6. The post-processing apparatus of the digital image forming apparatus according to claim 1, wherein said display means is mounted so that a screen thereof is substantially parallel to a surface of each of said bins upon which recorded matter is to be placed.

7. The post-processing apparatus of the digital image forming apparatus according to claim 1, wherein said display means is mounted so that a screen thereof is substantially parallel to a floor on which the digital image forming apparatus is installed.

8. The post-processing apparatus of the digital image forming apparatus according to claim 1, wherein said display means is mounted on a surface of each of said bins upon which recorded matter is to be placed.

9. The post-processing apparatus of the digital image forming apparatus according to claim 1, wherein said display means is mounted so that a screen thereof is substantially parallel to a surface of each of said bins upon which recorded matter is to be placed and that a character to be displayed in said display means is displayed substantially parallel to a floor on which said digital image forming apparatus is installed.

10. The post-processing apparatus of the digital image forming apparatus according to claim 1, wherein said display means is mounted on a main body of said post-processing apparatus at a position near to a corresponding bin.

11. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter;

display means for displaying image information data relating to the recorded matter stored in said bins;

data retaining means for retaining the image information data; and data searching means for searching specified data from the image information data retained in said data retaining means, wherein said display means displays a result of a search carried out by said data searching means.

12. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter;

display means for displaying image information data relating to the recorded matter stored in said bins; and identifying means for identifying an operator who operates said digital image forming apparatus, wherein said display means displays a bin allotted to the operator based on a result of identification carried out by said identifying means.

13. A post-processing apparatus of a digital image forming apparatus for forming an image on a recording medium based on digital image data and outputting the image on the recording medium as recorded matter, the post post-processing apparatus comprising:

a plurality of bins for storing recorded matter output from the digital image forming apparatus;

means for distributing the recorded matter to said bins according to image information data belonging to the image data of the recorded matter;

display means for displaying image information data relating to the recorded matter stored in said bins; and data accumulating means for temporarily accumulating the image data and the image information data therein, wherein, when there are a plurality of image data waiting to be output in said data accumulating means, said display means displays an output order of the image data waiting to be output based on the image information data in said data accumulating means.

14. The post-processing apparatus of the digital image forming apparatus according to claim 13, wherein, when an output of image data from said data accumulating means is in progress, said display means displays an output state of the image data being output based on the image information data in said data accumulating means.

15. A post-processing apparatus of a digital image forming apparatus for forming an image on a recording medium based on digital image data and outputting the image on the recording medium as recorded matter, the post-processing apparatus comprising:

a plurality of fins for storing recorded matter output from the digital image forming apparatus;

means for distributing the recorded matter to said bins according to image information data belonging to the image data of the recorded matter; and display means, mounted on each of said bins, for displaying information relating to said bins, according to a time elapsed.

16. The post-processing apparatus of the digital image forming apparatus according to claim 15, further comprising scrolling means for scrolling a display content displayed in said display means.

17. A post-processing apparatus of a digital image forming apparatus for forming an image on a recording medium based on digital image data and outputting the image on the recording medium as recorded matter, the post-processing apparatus comprising:

a plurality of bins, arranged in a vertical direction, for storing recorded matter output from the digital image forming apparatus;

means for distributing the recorded matter to said bins according to image information data belonging to the image data of the recorded matter; and display means for displaying information relating to said bins, according to a time elapsed, each of said display means having a screen which is formed so that a tilt angle of said screen with respect to a direction perpendicular to a surface of the post-processing apparatus to which said display means is attached becomes greater as a position of height of said display means in relation to the post-processing apparatus becomes lower.

18. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter;

display means, mounted on each of said bins, for displaying information relating to said bins;

display mode selecting means for selecting a display mode of said display means in advance;

detecting means for detecting an operator who approaches a predetermined area around the post-processing apparatus; and display control means for controlling said display means to display information in a display mode selected in advance through said display mode selecting means, according to a detection signal from said detecting means.

19. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter;

display means, mounted on each of said bins, for displaying information relating to said bins;

timer means for counting time elapsed after an output of recorded matter from the digital image forming apparatus;

recorded matter detecting means for detecting whether the recorded matter is present in said bins; and display control means for controlling said display means to change a display state on a screen of said display means according to the elapsed time counted by said timer means while said recorded matter detecting means is detecting the presence of the recorded matter.

20. The post-processing apparatus of the digital image forming apparatus according to claim 19, wherein said display control means controls said display means to change a display color on a screen of said display means according to the elapsed time counted by said timer means while said recorded matter detecting means is detecting the presence of the recorded matter.

21. The post-processing apparatus of the digital image forming apparatus according to claim 19, wherein said display control means controls said display means to flash on and off a screen of said display means according to the elapsed time counted by said timer means while said recorded matter detecting means is detecting the presence of the recorded matter.

22. A post-processing apparatus of a digital image forming apparatus for forming an image on a recording medium based on digital image data and outputting the image on the recording medium as recorded matter, the post-processing apparatus comprising:

a plurality of bins for storing recorded matter output from the digital image forming apparatus;

means for distributing the recorded matter to said bins according to image information data belonging to the image data of the recorded matter;

display means, mounted on each of said bins, for displaying information relating to said bins; and security mode selecting means for allowing an operator to select a security mode for the image information data of the recorded matter, wherein, when said security mode is selected through said security mode selecting means, said display means displays the image information data of the recorded matter in a form so that the image information data is not known by a third party.

* * * * *